United States Patent
Bian et al.

(10) Patent No.: US 12,293,778 B2
(45) Date of Patent: May 6, 2025

(54) METHOD AND APPARATUS FOR ADJUSTING SPEED OF MULTIMEDIA CLIP, DEVICE AND MEDIUM

(71) Applicant: Beijing Zitiao Network Technology Co., Ltd., Beijing (CN)

(72) Inventors: Weibo Bian, Beijing (CN); Xiangrui Zeng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/627,975

(22) Filed: Apr. 5, 2024

(65) Prior Publication Data

US 2024/0290351 A1    Aug. 29, 2024

Related U.S. Application Data

(63) Continuation of application No. PCT/CN2023/097371, filed on May 31, 2023.

(30) Foreign Application Priority Data

Jun. 1, 2022 (CN) .......................... 202210622737.1

(51) Int. Cl.
G11B 27/00 (2006.01)
G11B 27/34 (2006.01)
G11B 27/36 (2006.01)

(52) U.S. Cl.
CPC ............ *G11B 27/005* (2013.01); *G11B 27/34* (2013.01); *G11B 27/36* (2013.01)

(58) Field of Classification Search
CPC ........ G11B 27/005; G11B 27/34; G11B 27/36
See application file for complete search history.

(56) References Cited

U.S. PATENT DOCUMENTS 7,676,142 B1    3/2010 Hung
8,170,396 B2    5/2012 Kuspa et al.
(Continued)

FOREIGN PATENT DOCUMENTS

CN    108235123 B    9/2020
CN    112738627 A    4/2021
(Continued)

OTHER PUBLICATIONS

International Search Report and Written Opinion received for PCT Patent Application No. PCT/CN2023/097371, mailed on Sep. 28, 2023, 9 pages (2 pages of English Translation and 7 pages of Original Document).
(Continued)

*Primary Examiner* — Girumsew Wendmagegn

(57) ABSTRACT

Embodiments of the disclosure relates to a method and apparatus for adjusting the speed of multimedia clip, a device and a medium. The method includes: on an audio and video editing track, segmenting a multimedia material fragment into a plurality of segments; in response to a moving operation on a first control point, adjusting a speed change value according to the position of the first control point on the editing track, and controlling the speed of the video frame in the target segment to change according to the adjusted speed change value; adjusting the display length of the target segment on the editing track according to the playback duration after the speed change; in response to a moving operation on a second control point, adjusting the slope of the speed curve according to the position of the second control point on the target segment, and controlling the speed of video frames in the target segment to change in speed according to the speed curve after the slope adjustment.

17 Claims, 19 Drawing Sheets

--- a multimedia material clip is segmented into multiple intervals on an editing track for an audio or a video, wherein the multiple intervals comprise a target interval, and a first control point and a second control point corresponding to the target interval are provided on the multimedia material clip — 101 in response to a movement operation on the first control point, a speed change amount is adjusted based on a position of the first control point on the editing track to control the speed of video frames within the target interval to vary according to the adjusted speed change amount, and a displayed length of the target interval on the editing track is increased or decreased according to a playback duration of the speed-changed video frames — 102 in response to a movement operation on the second control point within the target interval, a slope of a speed curve is adjusted based on a position of the second control point within the target interval, and the speed of the video frames within the target interval is controlled to vary according to the speed curve with a slope adjusted — 103

(56) References Cited

U.S. PATENT DOCUMENTS

| | | |
|---|---|---|
| 8,621,356 B1 | 12/2013 | Cho |
| 9,014,544 B2 | 4/2015 | Wang et al. |
| 2008/0304678 A1 | 12/2008 | Chen et al. |
| 2010/0275121 A1 | 10/2010 | Johnson |
| 2014/0169765 A1 | 6/2014 | Wang et al. |
| 2021/0166730 A1 | 6/2021 | Gilson |
| 2023/0336827 A1 | 10/2023 | He et al. |
| 2023/0336828 A1 | 10/2023 | He |

FOREIGN PATENT DOCUMENTS

| | | |
|---|---|---|
| CN | 113825019 A | 12/2021 |
| CN | 114449313 A | 5/2022 |
| JP | 2002-125174 A | 4/2002 |
| JP | 2010-176575 A | 8/2010 |
| KR | 2015-0134007 A | 12/2015 |
| KR | 2020-0092426 A | 8/2020 |
| WO | 2021/254443 A1 | 12/2021 |

OTHER PUBLICATIONS

Office action received from Japanese patent application No. 2023-579684 mailed on May 21, 2024, 5 pages (3 pages English Translation and 2 pages Original Copy).
Office action received from Korean patent application No. 10-2024-7037203 mailed on Jan. 24, 2025, 20 pages (13 pages English Translation and 7 pages Original Copy).
Extended European Search issued Mar. 17, 2025 in Eurpoean Application No. 23815243.3 (12 pages).

METHOD AND APPARATUS FOR ADJUSTING SPEED OF MULTIMEDIA CLIP, DEVICE AND MEDIUM

CROSS-REFERENCE TO RELATED APPLICATIONS

The present disclosure is a U.S. National Stage Application under 35 U.S.C. § 371 of International Patent Application No. PCT/CN2023/097371, filed on May 31, 2023, which is based on and claims priority of Chinese application for invention No. 202210622737.1, filed on Jun. 1, 2022, the disclosure of which is hereby incorporated into this disclosure by reference in its entirety.

TECHNICAL FIELD

This disclosure relates to the technical field of video processing technology, in particular to a multimedia clip speed adjustment method, an apparatus, a device and a medium.

BACKGROUND

With the popularity of audio and video, users often adjust the speed of audio and video clips according to their own needs.

In related arts, conventional speed regulation comprises constant speed regulation and non-uniform speed regulation base on a curve. Users can select desired templates from speed regulation templates preset in applications according to their needs.

SUMMARY

An embodiment of the present disclosure provides a multimedia clip speed adjustment method, comprising: segmenting a multimedia material clip into multiple intervals on an editing track for an audio or a video, the multiple intervals comprising a target interval, wherein a first control point and a second control point corresponding to the target interval are provided on the multimedia material clip; adjusting, in response to a movement operation on the first control point, a speed change amount based on a position of the first control point on the editing track, controlling a speed of video frames within the target interval to change according to a speed change amount adjusted, and increasing or decreasing a displayed length of the target interval on the editing track according to a playback duration of the video frames of which the speed is changed; adjusting, in response to a movement operation on the second control point, a slope of a speed curve based on a position of the second control point within the target interval, and controlling the speed of the video frames within the target interval to change according to the speed curve with a slope adjusted.

An embodiment of the present disclosure further provides an apparatus for adjusting the speed of a multimedia clip, comprising: a segmentation module for segmenting a multimedia material clip into multiple intervals on an editing track for an audio or a video, the multiple intervals comprising a target interval, wherein a first control point and a second control point corresponding to the target interval are provided on the multimedia material clip; a first speed change control module for adjusting, in response to a movement operation on the first control point, a speed change amount based on a position of the first control point on the editing track, controlling the speed of video frames within the target interval to vary according to the adjusted speed change amount, and increasing or decreasing a displayed length of the target interval on the editing track according to a playback duration of the speed-changed video frames; a second speed change control module for adjusting, in response to a movement operation on the second control point, a slope of a speed curve based on a position of the second control point within the target interval, and controlling the speed of the video frames within the target interval to vary according to the speed curve with a slope adjusted.

An embodiment of the present disclosure provides an electronic device, comprising: a processor; a memory for storing processor executable instructions; wherein the processor is used to read the executable instructions from the memory and execute the instructions to implement the multimedia clip speed adjustment method provided in the embodiments of the present disclosure. An embodiment of the present disclosure further discloses a computer readable storage medium having stored thereon a computer program, wherein the computer program is used to perform the multimedia clip speed adjustment method provided in the embodiments of the present disclosure.

An embodiment of the present disclosure further provides a computer program, comprising: instructions that, when executed by a processor, cause the processor to implement the multimedia clip speed adjustment method provided in the embodiments of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Figure 1:
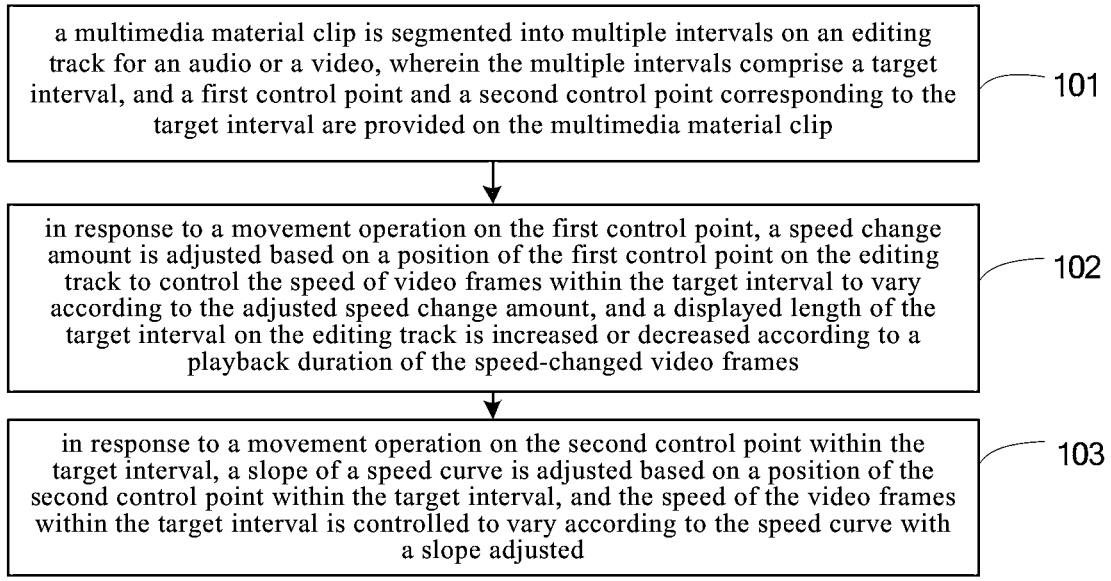
FIG. 1 is a flowchart of a multimedia clip speed adjustment method provided in embodiments of the present disclosure.

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

As mentioned above, selecting desired templates from speed regulation templates preset in applications based on needs cannot effectively meet users' needs for personalized speed change adjustment.

The process of customized variable speed adjustment may involve adjusting a speed curve by dragging and dropping multiple control points on a control panel. However, the adjustment of a control point may cause changes occurred in those curve portions that are adjacent to the control point, resulting in low accuracy and poor efficiency in variable speed adjustment of audio and video clips.

In order to solve the above technical problem, the embodiments of the present invention provides a multimedia clip speed adjustment method. In this method, a multimedia material is segmented into multiple intervals. The playback speed of video frames within these intervals can be adjusted independently, and an overall speed adjustment is made based on a first control point for video frames within each interval. It is also possible to achieve speed regulation based on a second control point to allow different playback speeds of different video frames within the same interval. As a result, fine speed adjustment can be achieved for the video frames, and the accuracy and efficiency of speed adjustment can be improved.

In order to solve or at least partially solve the above technical problem, the present disclosure provides a multimedia clip speed adjustment method, an apparatus, a device and a medium, which can achieve fine speed adjustment for video frames and improve the accuracy and efficiency of video frame speed adjustment.

The method will be described below in conjunction with an example.

FIG. 1 is a flowchart of a multimedia clip speed adjustment method provided in embodiments of the present disclosure. This method can be performed by a multimedia clip speed adjustment apparatus, wherein the apparatus can be implemented by software and/or hardware, and can generally be integrated in an electronic device. As shown in FIG. 1, the method comprises steps 101 to 103.

In step 101, a multimedia material clip is segmented into multiple intervals on an editing track for an audio or a video. The multiple intervals comprise a target interval, and a first control point and a second control point corresponding to the target interval are provided on the multimedia material clip.

It is easy to understand that in order to facilitate the speed adjustment of multimedia materials such as audio and video information, an editing track for an audio or a video can be displayed on a visualization interface. A video stream to be adjusted can be mapped to the audio or video editing track, with different intervals on the track corresponding to different video stream segments of the video stream. The display of the audio or video editing track can be called up by some shortcut keys, by triggering a preset control, or in other manners not listed herein.

In embodiments of the present disclosure, in order to achieve fine adjustment of playback speed for video frames of a video stream, a multimedia material is segmented into different intervals on the audio or video editing track. The initial playback speed of the video frames within an interval can be the playback speed of the video stream before segmentation.

In some embodiments, in order to reduce computational load, etc., when segmenting a multimedia material clip into multiple intervals, it is also detected whether the number of video frames in a target interval is less than a preset video threshold to avoid segmenting the multimedia material, such as a video stream, into too small intervals. Segmenting a multimedia material into too small intervals not only affects the efficiency of the playback speed adjustment, but also leads to an increase in computational load. The preset threshold can be calibrated based on experimental data, for example, the preset threshold can be 3. If the number of video frames detected is less than the video threshold, an inappropriate segmentation prompt is displayed, for example, a pop-up window displaying a message such as "Too small intervals are not allowed".

In some embodiments of this disclosure, to more intuitively distinguish different intervals, separators may be used as distinguishing markers for different intervals. For example, the separators can be any indicators for segmenting a video stream into different intervals, comprising but not limited to one or more of text identifiers, letter identifiers, pattern identifiers, color identifiers, etc.

Figure 2:
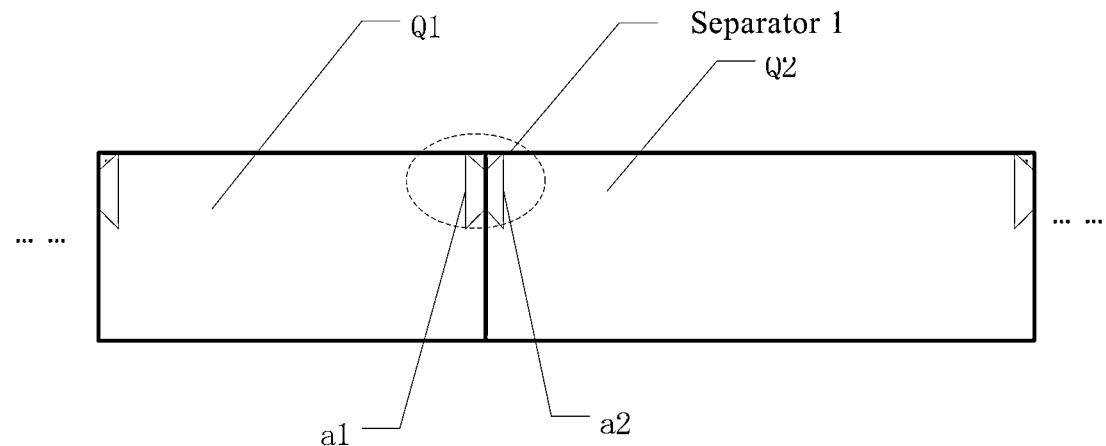
FIG. 2 is a schematic diagram of a speed adjustment scenario for audio and video information provided in embodiments of the present disclosure.

In some embodiments, as shown in FIG. 2, separators each comprising two opposing trapezoidal patterns are used to segment a video stream into multiple intervals. For example, a separator 1 of interval Q1 and Q2 comprises two trapezoidal patterns a1 and a2.

To separately adjust the playback speed of video frames corresponding to different intervals, after segmenting different intervals with the separators, a part of the separator is used as a first control point of an adjacent target interval. This first control point is used to isolate the speed adjustment of the target interval from the speed adjustment of another interval.

In some embodiments, in order to ensure the display of a complete separator on the intervals and to avoid the splitting of the two parts of the separator, which may otherwise affect the display effect of the interval segmentation, in response to an activation operation on a first sticky control switch on the target interval (which may be a control displayed on the visualization interface, etc.), an end position of the movement operation on the first control point on the editing track is obtained, which is then aligned with a segmentation position of another adjacent interval. This ensures that other separators and intervals on the audio/video edit track can follow the movement of the first control point.

That is, the first control point is used separately to control the playback speed of video frames within its corresponding target interval. Different intervals correspond to different first control points, thus enabling independent playback speed adjustment for video frames within different intervals.

In different application scenarios, the positions set of the first control points in the adjacent target intervals may be different.

Figure 3A:
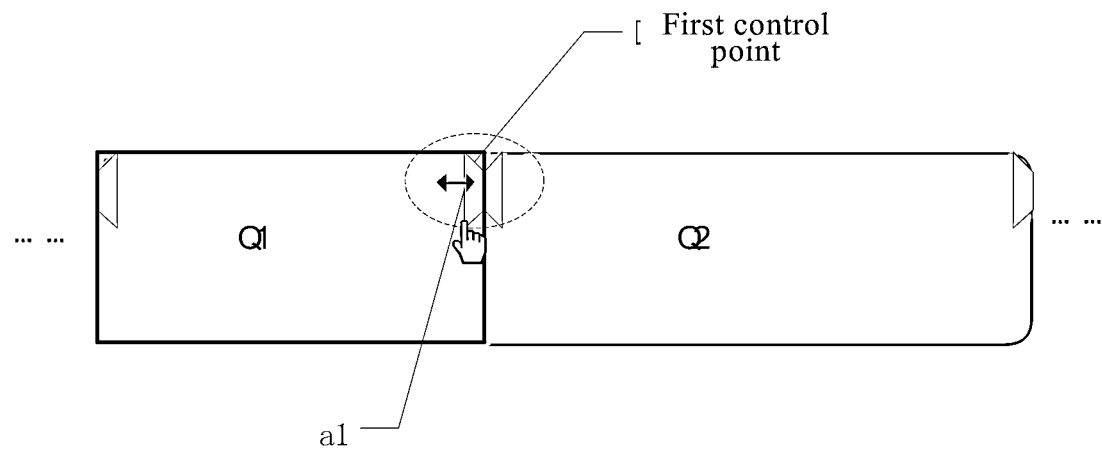
FIG. 3A is a schematic diagram of another speed adjustment scenario for audio and video information provided in embodiments of the present disclosure.

In some embodiments, the first control point is placed at the end of the target interval. In the case where interval segmentation is performed based on separators, an interval between a left separator pattern and a right separator pattern can be defined by the left separator pattern and the right separator pattern. Therefore, the left separator pattern, i.e., a separator pattern corresponding to the end of the target interval, can be used as the first control point of the left adjacent target interval, as shown in FIG. 3A; If the separator is as shown in FIG. 2 above, the trapezoidal pattern a1, i.e., the left pattern of separator 1, can be used as the first control point, which is used to control the playback speed of video frames in the left adjacent interval Q1 of the trapezoidal pattern a1.

Figure 3B:
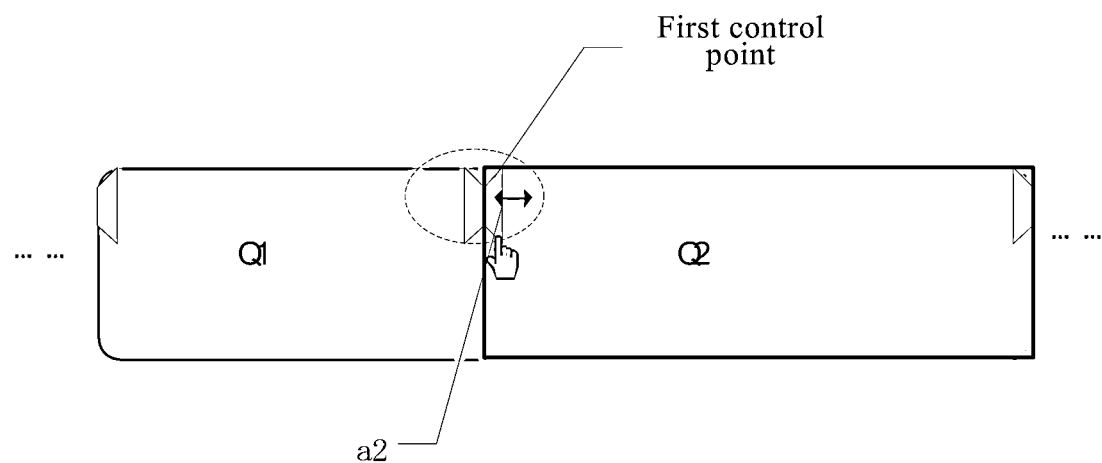
FIG. 3B is a schematic diagram of still another speed adjustment scenario for audio and video information provided in embodiments of the present disclosure.

In other embodiments, the first control point is placed at the start of the target interval. In the case where interval segmentation is performed based on separators, an interval between a left separator pattern and a right separator pattern can be defined by the left separator pattern and the right separator pattern. Therefore, the left separator pattern, i.e., a separator pattern corresponding to the start of the target interval, can be used as the first control point of the left adjacent target interval, as shown in FIG. 3B. If the separator is as shown in FIG. 2 above, the trapezoidal pattern a2, i.e., the right pattern of separator 1, can be used as the first control point, which is used to control the playback speed of video frames within the right adjacent interval Q2 of the trapezoidal pattern a2.

In this embodiment, in addition to a first control point provided corresponding to the target interval on the multimedia material clip, a second control point is also provided. For example, the second control point is used for variable speed adjustment of video frames within the target range. The relevant description of the second control point can be found in the following embodiments.

In step 102, in response to a movement operation on the first control point, a speed change amount is adjusted based on a position of the first control point on the editing track to control the speed of video frames within the target interval to vary according to the adjusted speed change amount, and a displayed length of the target interval on the editing track is increased or decreased according to a playback duration of the speed-changed video frames.

As mentioned above, the first control point is used to adjust the playback speed of video frames within the target interval. Therefore, in response to the movement operation on the first control point, the playback speed of video frames within the target interval can be controlled. For example, the movement operation on the first control point can be triggered by a drag operation, a voice, or other means not specifically listed herein.

In embodiments of the present disclosure, in response to the movement operation on the first control point, the first control point is controlled to move on the editing track; a speed change amount is adjusted based on the position of the first control point on the editing track, so as to control the speed of relevant video frames within the target interval to change according to the adjusted speed change amount.

In this embodiment, a uniform change in the playback speed of the video frames within the target interval is controlled based on the first control point, and the degree of speed change depends on the movement length of the first control on the editing track.

To visually indicate the playback duration of the video frames within the target interval, the displayed length of the target interval on the editing track can be increased or decreased according to a playback duration of the speed-changed video frames. For example, to further enhance the intuitiveness of the adjustment, it is possible to visually enhance the display of the target interval being adjusted. For example, a highlighted rectangular box can be used to indicate the range of the current target interval on the audio or video editing track.

It should be noted that in different application scenarios, the method of adjusting, in response to the movement operation on the first control point, the speed change amount based on the position of the first control point on the editing track is different, as exemplarily described below.

In some embodiments, if the end position of a target interval is used as the first control point of the left adjacent target interval, in response to a right movement operation on the first control point, the end position of the target interval is moved to the right on the editing track, thereby the speed change amount is decreased based on the position of the first control point on the editing track, while the start position of the target interval remains unchanged on the editing track.

That is, in some embodiments, the video frames corresponding to each target interval remain unchanged. Adjusting the first control point to change the end position of the target interval on the editing track and moving the end position of the target interval to the right on the editing track can be equivalently considered as increasing the playback duration of the video frames corresponding to the target interval. Thus, the playback speed of the video frames within the target interval is correspondingly decreased. The speed change amount is decreased based on the position of the first control point on the editing track to decrease the playback speed of the video frames within the target interval.

Figure 4A:
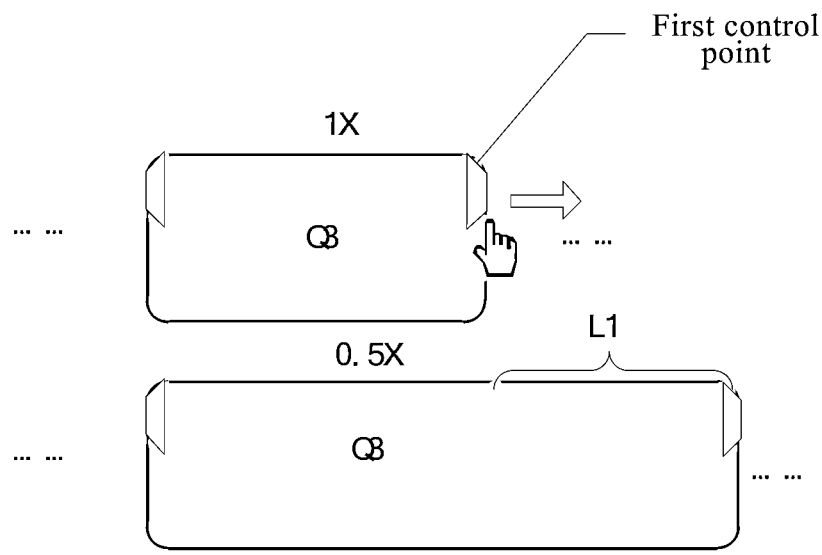
FIG. 4A is a schematic diagram of still another speed adjustment scenario for audio and video information provided in embodiments of the present disclosure.

For example, as shown in FIG. 4A, for the target interval Q3, in response to a right movement operation on the first control point, the end position of the target interval is moved to the right on the editing track, thereby the speed change amount is decreased based on the position of the first control point on the editing track. For example, if the end position of the target interval on the editing track is moved to the right by L1, the speed change amount is reduced by 0.5×, resulting in the playback speed of the video frames within the target interval being decreased from the original 1× to 0.5×.

Alternatively, in some embodiments, in response to a left movement operation on the first control point, the end position of the target interval on the editing track is moved to the left, such that the speed change amount is increased based on the position of the first control point on the editing track, while the start position of the target interval on the editing track remains unchanged.

That is, in some embodiments, the video frames corresponding to each target interval remain unchanged. Adjusting the first control point to change the end position of the target interval on the editing track and moving the end position of the target interval to the left on the editing track can be equivalently considered as decreasing the playback duration of the video frames corresponding to the target interval. Thus, the playback speed of the video frames within the target interval is correspondingly increased. The speed change amount is increased based on the position of the first control point on the editing track to increase the playback speed of the video frames within the target interval.

Figure 4B:
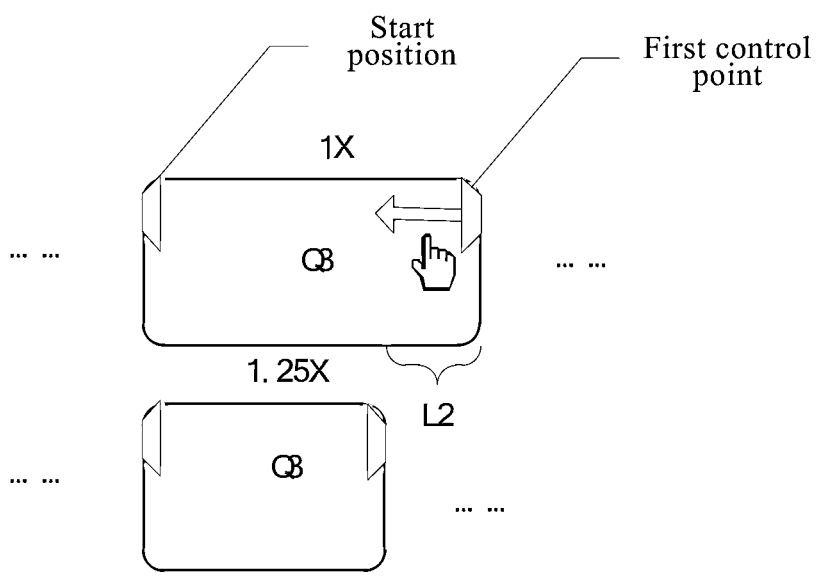
FIG. 4B is a schematic diagram of still another speed adjustment scenario for audio and video information provided in embodiments of the present disclosure.

For example, as shown in FIG. 4B, for the target interval Q3, in response to a left movement operation on the first control point, the end position of the target interval is moved to the left on the editing track, thereby the speed change amount is increased based on the position of the first control point on the editing track. For example, if the end position of the target interval on the editing track is moved to the right by L2, the speed change amount is increased by 0.25×, resulting in the playback speed of the video frames within the target interval being increased from the original 1× to 1.25×.

In some embodiments, if the start position of the target interval is used as the first control point of the right adjacent target interval, in response to a right movement operation on the first control point, the start position of the target interval is moved to the right on the editing track, such that the speed change amount is increased based on the position of the first control point on the editing track, while the end position of the target interval on the editing track remains unchanged.

That is, in some embodiments, the video frames corresponding to each target interval remain unchanged. Adjusting the first control point to change the start position of the target interval on the editing track and moving the start position of the target interval to the right on the editing track can be equivalently considered as decreasing the playback duration of the video frames corresponding to the target interval. Thus, the playback speed of the video frames within the target interval is correspondingly increased. The speed change amount is increased based on the position of the first control point on the editing track to increase the playback speed of the video frames within the target interval.

Figure 5A:
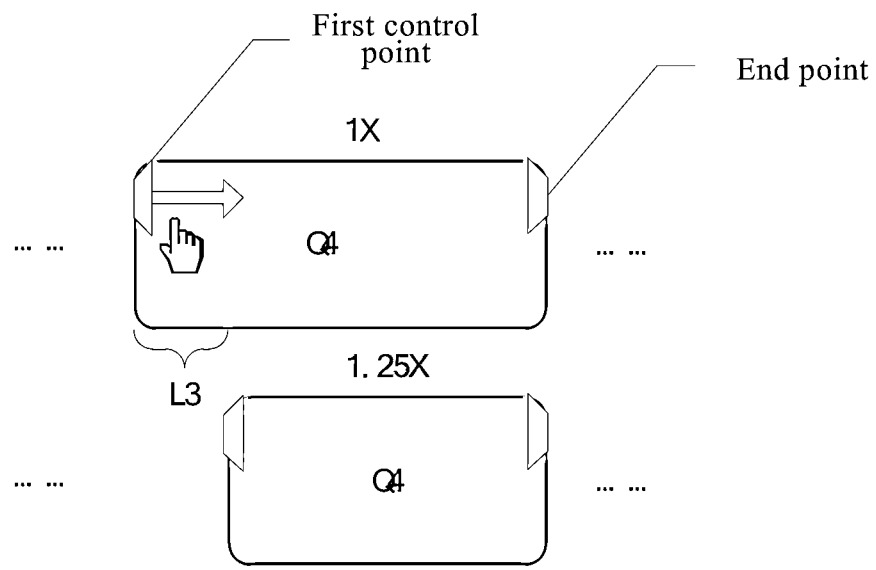
FIG. 5A is a schematic diagram of still another speed adjustment scenario for audio and video information provided in embodiments of the present disclosure.

For example, as shown in FIG. 5A, for the target interval Q4, in response to a right movement operation on the first control point, the start position of the target interval is moved to the right on the editing track, thereby the speed change amount is increased based on the position of the first control point on the editing track. For example, if the start position of the target interval on the editing track is moved to the right by L3, the speed change amount is increased by 0.25×, resulting in the playback speed of the video frames within the target interval being increased from the original 1× to 1.25×.

Alternatively, in some embodiments, in response to a left movement operation on the first control point, the start position of the target interval on the editing track is moved to the left, such that the speed change amount is decreased based on the position of the first control point on the editing track, while the end position of the target interval on the editing track remains unchanged.

That is, in some embodiments, the video frames corresponding to each target interval remain unchanged. Adjusting the first control point to change the start position of the target interval on the editing track and moving the start position of the target interval to the left on the editing track can be equivalently considered as increasing the playback duration of the video frames corresponding to the target interval. Thus, the playback speed of the video frames within the target interval is correspondingly decreased. The speed change amount is decreased based on the position of the first control point on the editing track to decrease the playback speed of the video frames within the target interval.

Figure 5B:
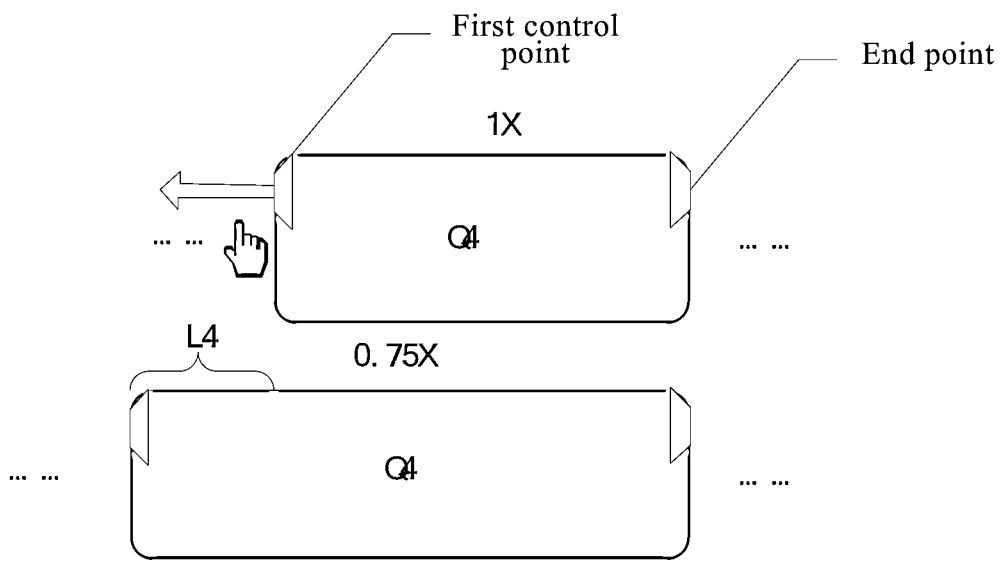
FIG. 5B is a schematic diagram of still another speed adjustment scenario for audio and video information provided in embodiments of the present disclosure.

For example, as shown in FIG. 5B, for the target interval Q4, in response to a left movement operation on the first control point, the start position of the target interval is moved to the left on the editing track, and the speed change amount is decreased based on the position of the first control point on the editing track. For example, if the start position of the target interval on the editing track is moved to the left by L4, the speed change amount is reduced by 0.25×, resulting in the playback speed of the video frames within the target interval being decreased from the original 1× to 0.75×.

In step 103, in response to a movement operation on the second control point within the target interval, a slope of a speed curve is adjusted based on a position of the second control point within the target interval, and the speed of the video frames within the target interval is controlled to vary according to the speed curve with a slope adjusted.

Figure 6A:
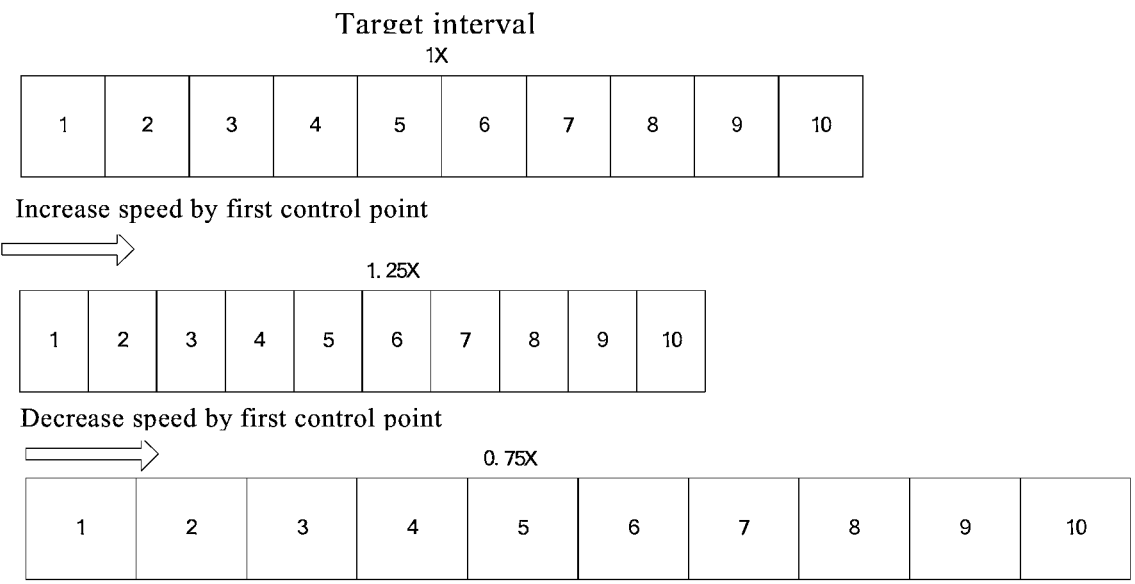
FIG. 6A is a schematic diagram of still another speed adjustment scenario for audio and video information provided in embodiments of the present disclosure.

Since the first control point mentioned above is only used to control a uniform change in the playback speed of video frames within the target interval, for example, as shown in FIG. 6A, if the target interval contains 10 video frames, these 10 video frames have the same playback speed that is changed uniformly, an effect achieved based on the first control point is a uniform increase or decrease in the playback speed of these 10 video frames. The playback speed of each video frame is the same (the width of each video frame in the figure reflects the playback speed of the video frame).

Figure 6B:
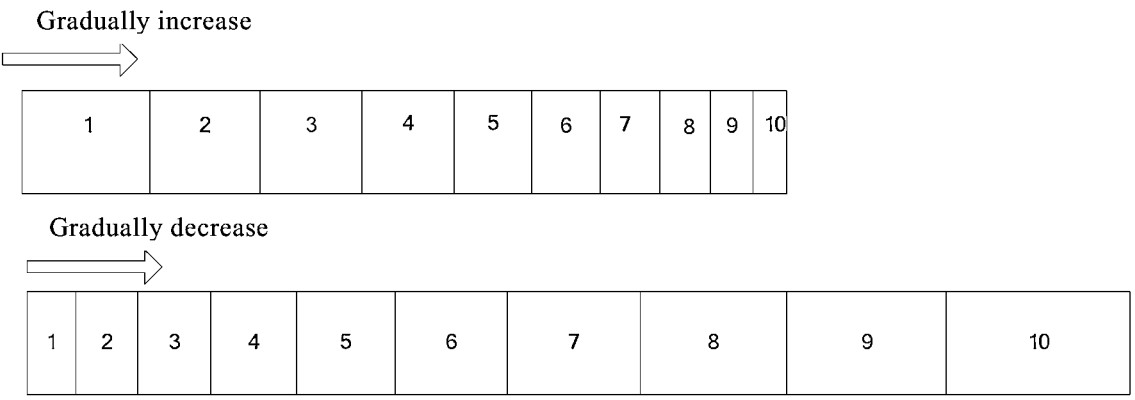
FIG. 6B is a schematic diagram of still another speed adjustment scenario for audio and video information provided in embodiments of the present disclosure.

In some embodiments, in response to the user has a requirement for variable speed adjustment of video frames, the above playback speed adjustment based only on the first control point is not sufficient to achieve a high level of adjustment refinement in display. For example, as shown in FIG. 6B, if the target interval contains 10 video frames, a user may want the playback speed of these 10 video frames to be gradually decreased or increased (the width of the video frame in the figure reflects the playback speed of the video frame).

In some embodiments of this disclosure, in order to meet the above requirements for variable speed adjustment of video frames, a second control point is also provided for the target interval. The second control point can be presented as, but is not limited to, one or more of a text identifier, a letter identifier, a pattern identifier, and a color identifier, etc.

In some embodiments, in response to a position of the second control point within the target interval, the speed of the video frames within the target interval changes according to a speed curve with a slope adjusted.

Figure 7:
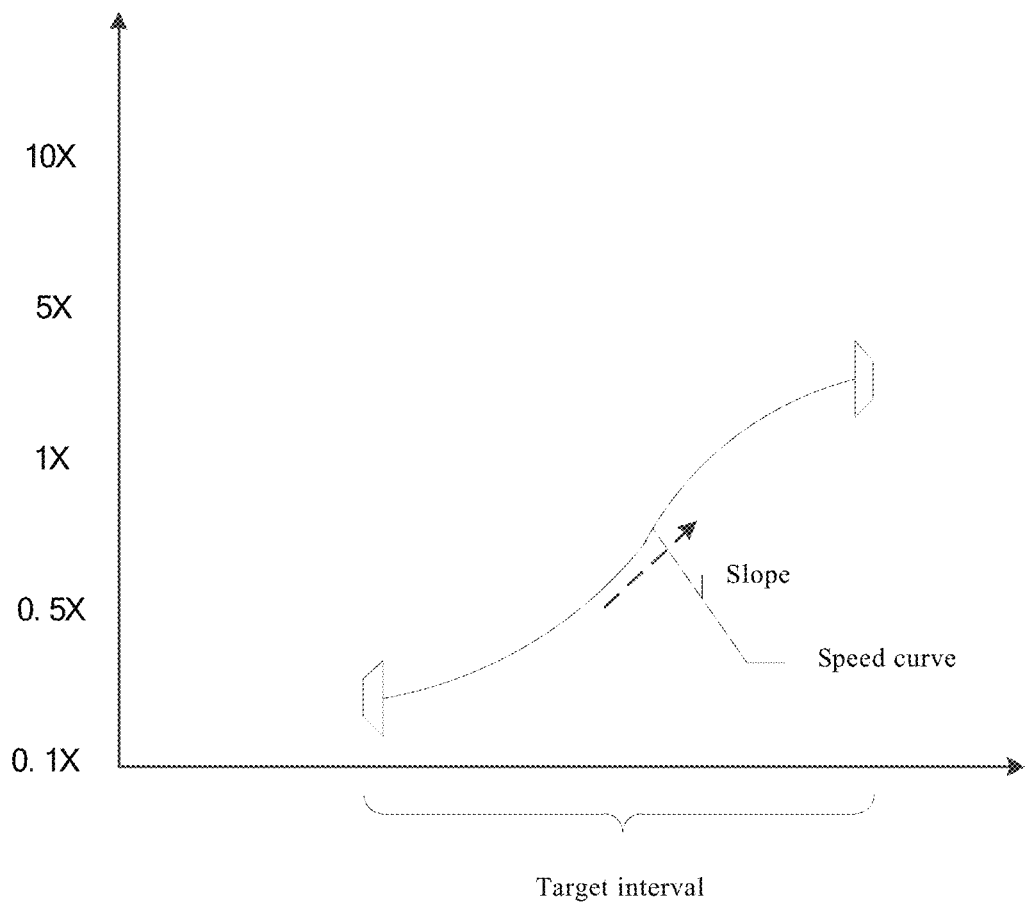
FIG. 7 is a schematic diagram of still another speed adjustment scenario for audio and video information provided in embodiments of the present disclosure.

In some embodiments, as shown in FIG. 7, the vertical axis of the speed curve corresponds to the playback speed, and the horizontal axis corresponds to the video frames of the target interval. Thus, the slope of the speed curve can determine the playback speed of video frames within the target range, and can be used to refine the variable speed adjustment of the video frames. For example, referring to FIG. 7, the steeper the speed curve, the greater the rate of change of the corresponding playback speed; in contrast, the smoother the speed curve, the lower the rate of change of the corresponding playback speed.

In different application scenarios, the method of adjusting the slope of the speed curve based on the position of the second control point within the target interval is different. These different adjustment methods are described in the following embodiments, and will not be repeated here.

It should be emphasized that the first control point is mainly used for overall control on the playback speed of video frames within the corresponding target interval. Therefore, as shown in FIG. 6A above, in response to the video frames within the target interval are played back at a constant speed, the video frames within the target interval are controlled to be played back at a constant speed that is increased or decreased according to the adjusted speed change amount.

However, in response to a variable speed change to the video frames within the target interval achieved by control through a second control point, the first control point can still achieve the effect of an overall change based on the variable speed of the video frames. That is, in response to the video frames within the target interval are played back at non-uniform speeds based on the speed curve, the video frames within the target interval are all controlled to be played back at non-uniform speeds that are increased or decreased according to an adjusted speed change amount.

Figure 6C:
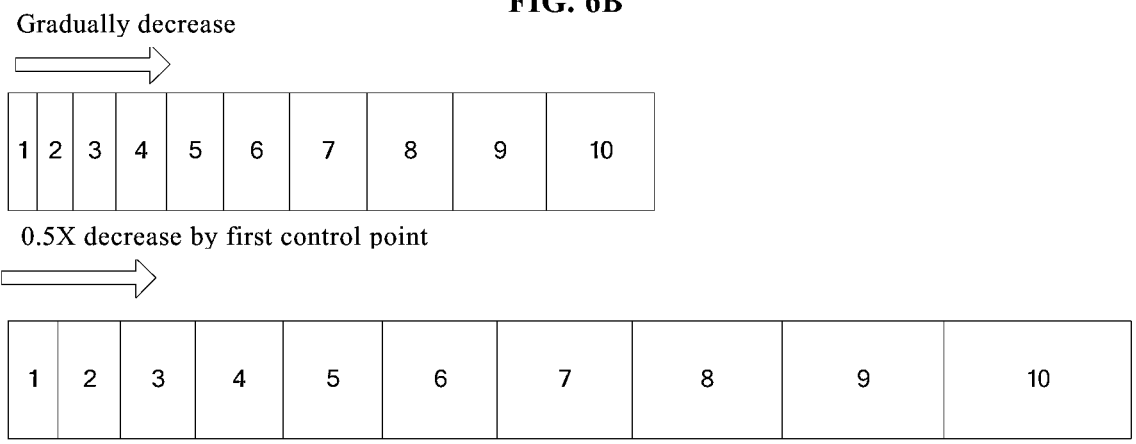
FIG. 6C is a schematic diagram of still another speed adjustment scenario for audio and video information provided in embodiments of the present disclosure.

For example, as shown in FIG. 6C, if the target interval contains 10 video frames, these 10 video frames have playback speeds that gradually decrease as determined by the speed curve. If the corresponding speed change amount determined based on the movement operation on the first control point is a speed decrease of 0.5×, all the playback speeds are decreased by 0.5× based on the gradually decreased playback speeds of these 10 video frames.

In summary, in the multimedia clip speed adjustment method provided in this embodiment, the multimedia material clip is segmented into multiple intervals on an editing track for an audio or a video. For example, the multiple intervals comprise a target interval. A first control point and a second control point corresponding to the target interval are provided on the multimedia material clip. In response to a movement operation on the first control point, a speed change amount is adjusted based on the position of the first control point on the editing track, so as to control the speed of the video frames within the target interval to change according to the adjusted speed change amount, and the displayed length of the target interval on the editing track is increased or decreased according to a playback duration of the speed-changed video frames. In response to a movement operation on the second control point within the target interval, a slope of a speed curve is adjusted based on a position of the second control point within the target interval, and the speed of the video frames within the target interval is controlled to vary according to the speed curve with a slope adjusted. Therefore, through segmenting the multimedia material into multiple intervals, the playback speed of video frames within these intervals can be adjusted independently, and an overall speed adjustment can be made based on a first control point for video frames within each interval. It is also possible to achieve variable speed adjustment based on a second control point to allow different playback speeds of different video frames within the same interval. As a result, fine adjustment of video frame playback speed can be achieved, and the accuracy and efficiency of video frame playback speed adjustment can be improved.

As shown in the above figure, in order to ensure the intuitive speed adjustment and improve the speed adjustment efficiency, a schematic diagram corresponding to the multimedia material clip can also be displayed in an area of the function panel. For example, the schematic diagram comprises a speed control indicator corresponding to the first control point, and a speed adjusted based on the first control point for the target interval is displayed in a corresponding area of the schematic interval. Therefore, based on the association display of the schematic diagram and the audio or video editing track, the speed adjustment effect of the current first control point can be visually displayed.

Figure 8A:
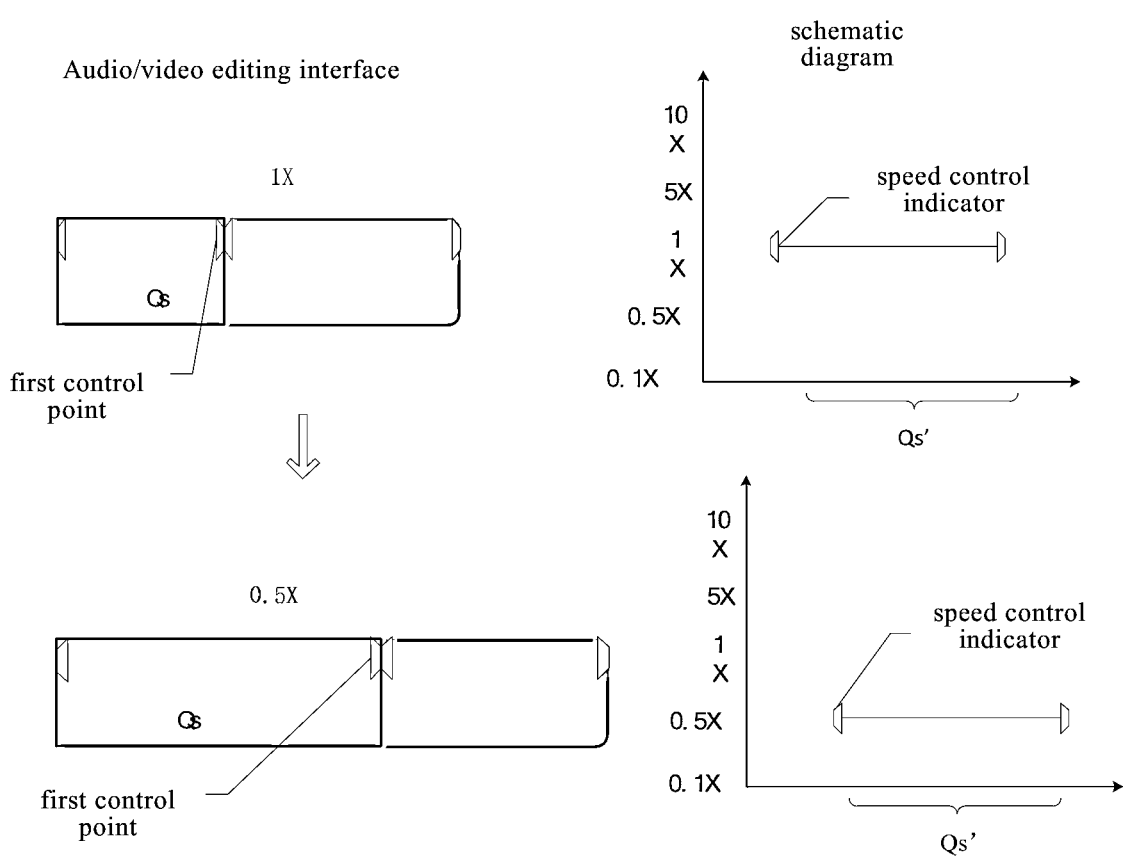
FIG. 8A is a schematic diagram of still another speed adjustment scenario for audio and video information provided in embodiments of the present disclosure.

For example, referring to FIG. 8A, a schematic diagram is displayed in association with the multimedia material clip in an area of the function panel. The schematic diagram comprises a speed control indicator corresponding to the first control point and a schematic interval Qs' corresponding to the target interval Qs. The first control point a2s is used as the speed control indicator of the adjacent schematic interval, and a speed of the target interval adjusted according to the first control point is displayed in the corresponding area of the schematic interval Qs'. The adjusted speed in the figure is 0.5×.

In some embodiments of the present disclosure, the speeds of the video frames adjusted based on the second control point are also displayed on the schematic diagram, i.e., the slope of the speed curve is adjusted based on the position of the second control point within the target interval; a speed curve with a slope adjusted is displayed in the schematic interval in association with a speed range of the speed curve.

Figure 8B:
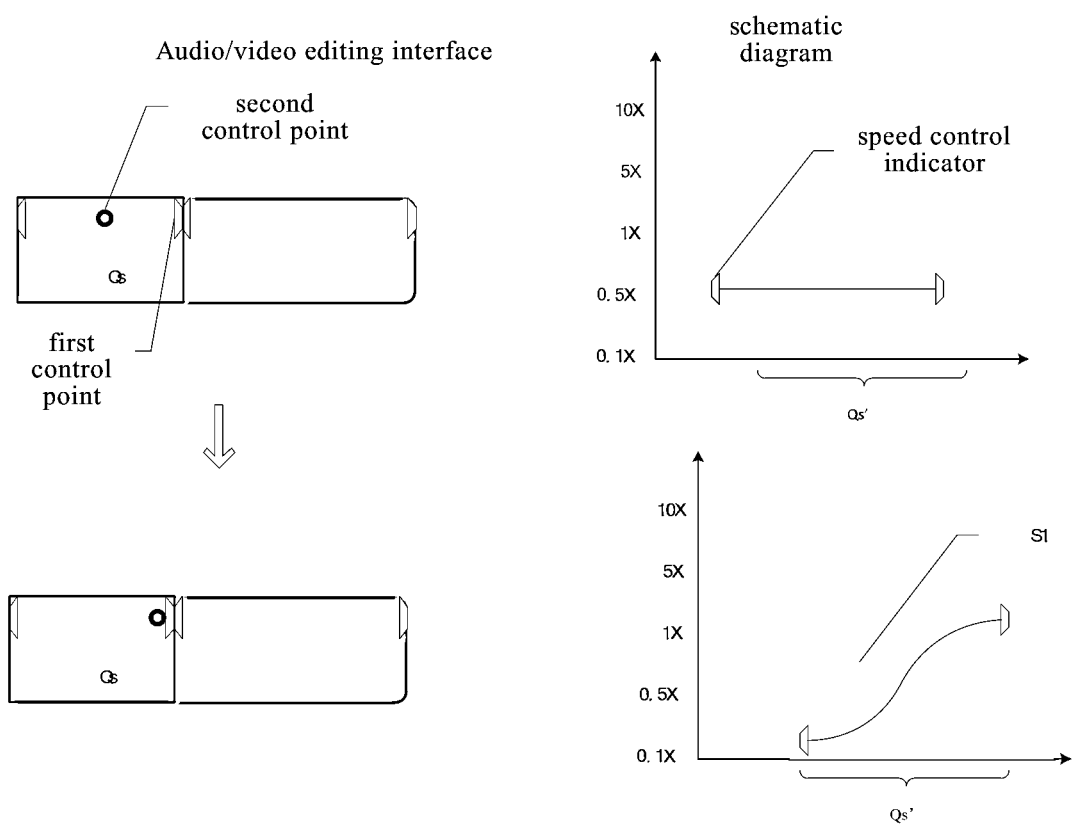
FIG. 8B is a schematic diagram of still another speed adjustment scenario for audio and video information provided in embodiments of the present disclosure.

For example, as shown in FIG. 8B, if the position of the second control point in the target interval Qs moves from the middle position to the end position of the target interval, the slope of the speed curve is adjusted based on the position of the second control point within the target interval. A resulted speed curve S1 and a range of speed values are shown in the figure. Thus, users can visually observe the result of speed adjustment.

Figure 9A:
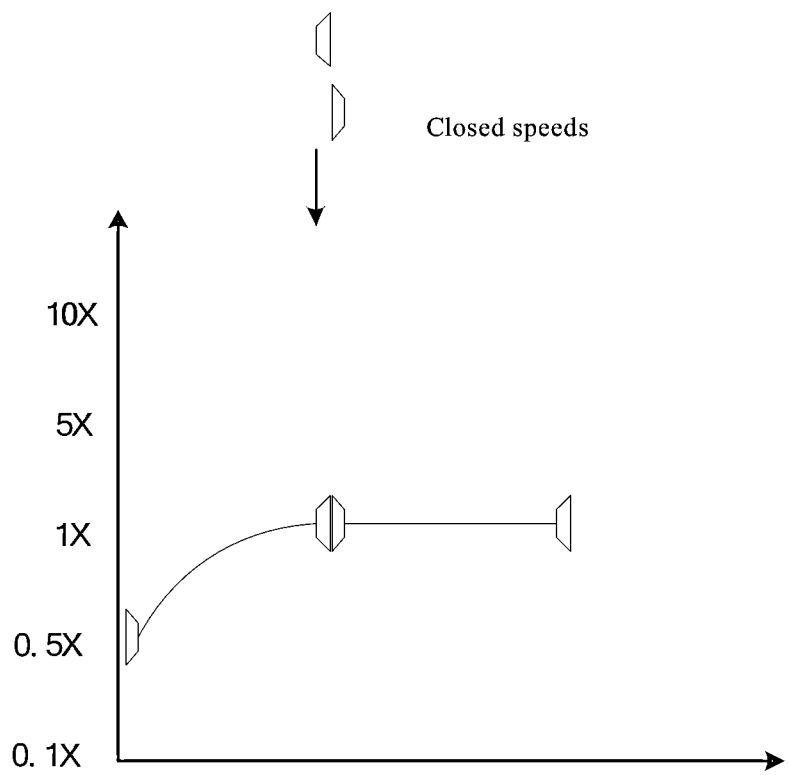
FIG. 9A is a schematic diagram of still another speed adjustment scenario for audio and video information provided in embodiments of the present disclosure.
Figure 9B:
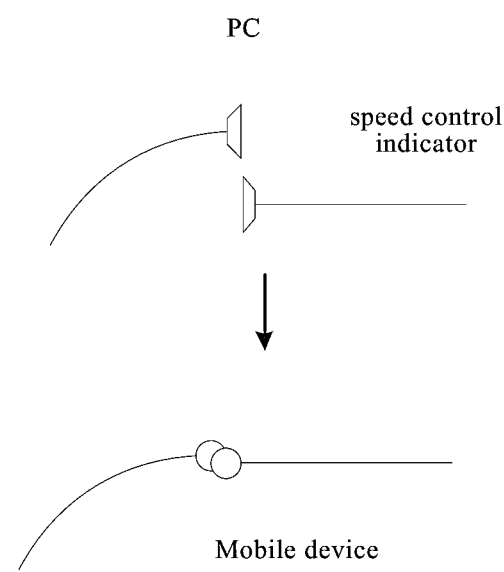
FIG. 9B is a schematic diagram of still another speed adjustment scenario for audio and video information provided in embodiments of the present disclosure.

In some embodiments of the present disclosure, in response to a draft saving operation, speeds corresponding to speed control indicators of adjacent schematic intervals are compared. If the speed control indicator at the end position of the left interval and the speed control indicator at the start position of the right interval correspond to the same speed, as shown in FIG. 9A, the two speed control indicators are combined and saved as one speed control point for display on a mobile device; If the speed control indicator at the end position of the left interval and the speed control indicator at the start position of the right interval correspond to different speeds, as shown in FIG. 9B, the two speed control indicators are saved as two speed control points for display on a mobile device respectively.

In some embodiments, in order to further facilitate user adjustment, the schematic diagram can be saved as a draft and synchronously displayed on other devices. For example, a schematic diagram adjusted on a PC can be synchronized to a mobile device for display.

In some embodiments of the present disclosure, for a schematic diagram synchronized to a mobile terminal such as a mobile phone, the schematic diagram can be operated by a user on the mobile terminal; if a part of the separator is used as the first control point, in the embodiments, for a separator consisting of two parts, these parts can be displayed in other patterns on the mobile terminal. That is, display conversion is performed on the mobile terminal to adapt to the display rules of the mobile terminal.

Figure 10A:
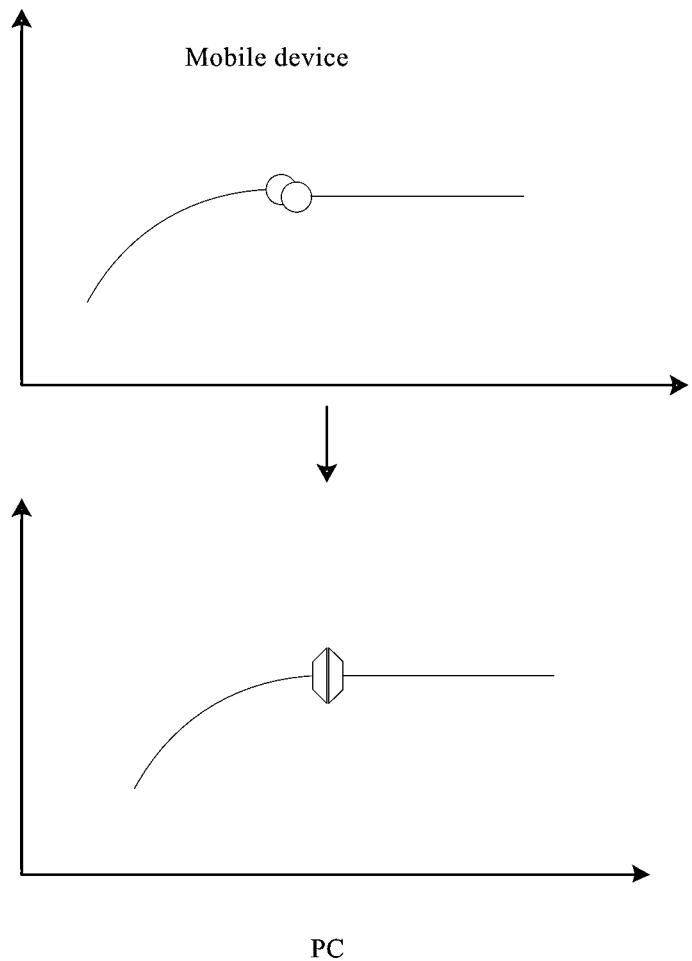
FIG. 10A is a schematic diagram of still another speed adjustment scenario for audio and video information provided in embodiments of the present disclosure.

For example, as shown in FIG. 10A, on a mobile terminal, the different parts of a separator are displayed in the form of dots that are separated by m pixels. If it is detected that one dot is dragged by the user, the x-axis coordinate of the dot can be changed accordingly. When synchronized back to a PC, two corresponding dots are displayed as different parts of a separator. However, since the interval between different parts of the separator is one frame on the PC, and there is also a limit to the minimum number of video frames comprised in an interval, for example, the minimum number cannot be less than 3 frames, when the x-axis position corresponding to the dragged dot on the mobile device conflicts with the display rules on the PC, the dot can be discarded after the interaction, without displaying a separator part corresponding to the dot on the PC.

Figure 10B:
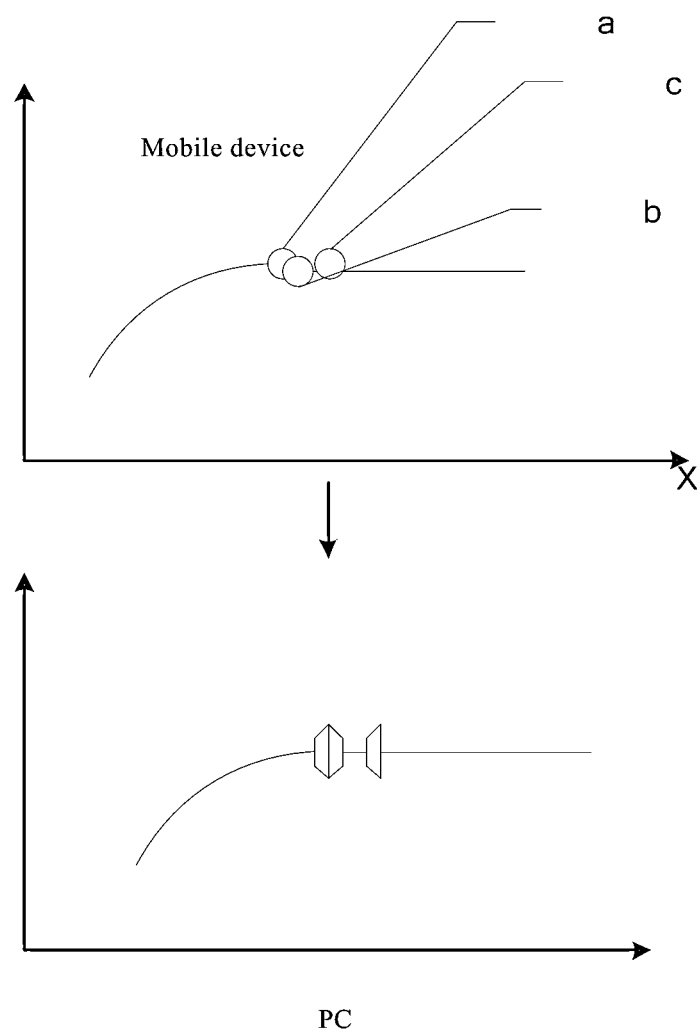
FIG. 10B is a schematic diagram of still another speed adjustment scenario for audio and video information provided in embodiments of the present disclosure.
Figure 10C:
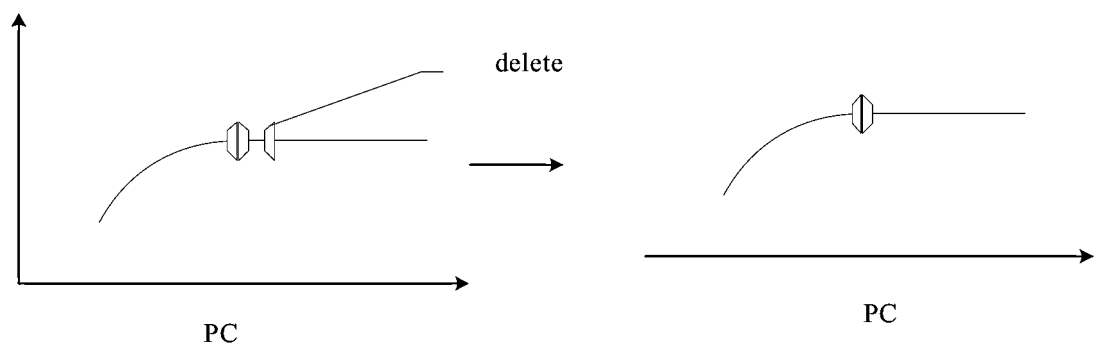
FIG. 10C is a schematic diagram of still another speed adjustment scenario for audio and video information provided in embodiments of the present disclosure.

In some embodiments, when the schematic diagram adjusted on the mobile terminal is synchronized back to the PC, with the x-axis spacing=1 frame, as shown in FIG. 10B, two of those dots are combined and displayed as a complete separator without combining the additional dots. For example, if there are three dots a, b and c spaced by 1 frame, dots a and b are combined and displayed as a complete separator, and dot c is displayed separately as part of a separator. For dots that are not separated by 1 frame, each dot can be displayed as part of a separator. After synchronized to a PC, if there is an interval containing video frames less than a preset minimum number as shown in FIG. 10C, the first separator part of the interval can be retained and other separator part of the interval can be deleted.

In summary, in the multimedia clip speed adjustment method provided in the embodiments, a schematic diagram associated with the multimedia material clip is displayed in an area of the function panel. The schematic diagram comprises a schematic interval corresponding to the target interval. A speed adjustment result of the first control point and the second control point on the target interval is displayed in a corresponding area of the schematic interval, thereby improving the intuitiveness and user experience of the speed adjustment.

Based on the above embodiment, a trigger operation on the second control point is used to achieve a variable speed change of the video frames within the target interval. The second control point determines the slope of the speed curve for the variable speed change. The following is an example of how to adjust the slope of the speed curve based on the position of the second control point within a target interval.

In some embodiments of the present disclosure, in response to a trigger operation on a second control point within the target interval, adjusting a slope of a speed curve based on the position of the second control point within the target interval comprises the following steps.

In response to an operation of adding a second control point within the target interval, adjusting a slope of the speed curve based on the position where the second control point is added within the target interval. In the embodiments, different positions of the second control point within the target interval corresponds to different slopes. For example, in response to the second control point is in the middle position of the target interval, the slope of the speed curve is set to zero to produce a constant speed line that matches the speed set by the first control point, so that the video frames within the target interval are controlled to be played back at a constant speed.

Figure 11:
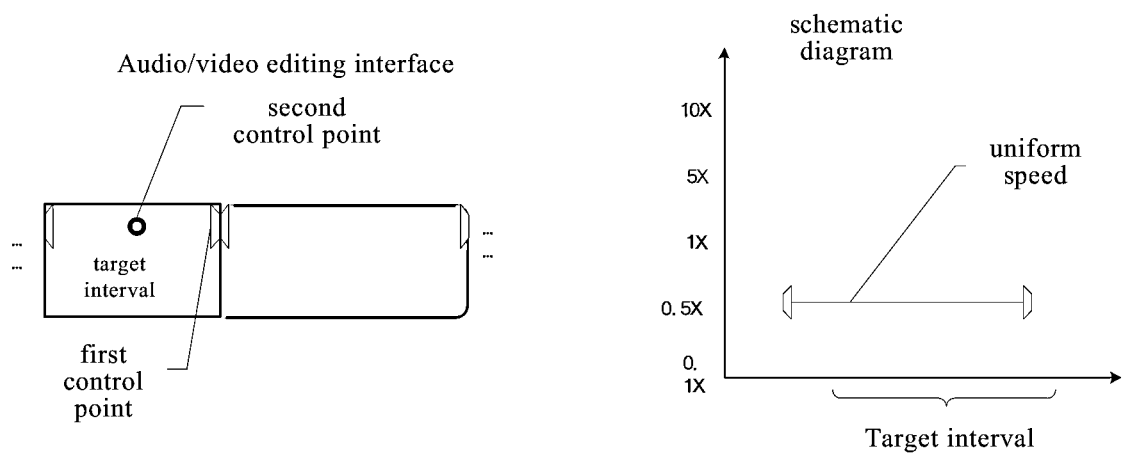
FIG. 11 is a schematic diagram of still another speed adjustment scenario for audio and video information provided in embodiments of the present disclosure.

For example, as shown in FIG. 11, if the second control point is a dot displayed within the target interval, the position of the dot in the target interval determines the slope of the speed curve; if the dot is set at the middle position of the track corresponding to the target interval, the corresponding slope is 0. In this case, the video frames within the target interval are played back at a constant speed.

If the dot is moved to the right on the corresponding track of the target interval, the slope changes accordingly, for example, the average slope of the speed curve gradually increases. In this case, the playback speed of the video frames within the target interval changes with the slope to achieve a playback speed adjustment; if the dot is moved to the left on the corresponding track of the target interval, the slope changes accordingly, for example, the average slope of the speed curve gradually decreases. In this case, the playback speed of the video frames within the target interval changes with the slope to achieve a playback speed adjustment.

In some embodiments, the slope of the speed curve can also be adjusted based on the movement position of the second control point within the target interval in response to a movement operation of the second control point. After adjusting the slope of the speed curve based on the adding position of the second control point within the target interval in response to an operation of adding a second control point within the target interval, the slope of the speed curve can be further adjusted based on the movement position of the second control point within the target interval. For example, if the slope corresponding to the adding position of the second control point within the target interval is 0, the slope of the speed curve can be adjusted with the right or left movement of the second control point.

When the second control point is moved to the right or left, the slope adjustments are different in different application scenarios.

In some embodiments, candidate movement positions of the second control point within the target interval are obtained, and a correspondence between those candidate positions and their corresponding slope values is constructed. The change in slope between different candidate positions can be associated with or not associated with the position change of the candidate positions, which is not limited herein.

In the embodiments, in response to a movement operation on the second control point, a target position to which the second control point moves is determined, and a slope value corresponding to the target position is determined by querying the above correspondence to adjust the slope of the speed curve.

In other embodiments, in response to a movement of the second control point between the middle position and the end position of the target interval, the slope of the speed curve is adjusted to generate an ascending speed curve. In response to the second control point located at the end position of the target interval, the speed curve has the largest slope value. That is, in response to the second control point located at the end position of the target interval, the ascending speed curve becomes overall steeper. In this case, the largest slope value can be understood as the largest average slope value of the speed curve.

It can be understood that in this embodiment, in response to the second control point located at the end position of the target interval and the second control point is located at the end position of the target interval, the slope change rate from the start position to the middle position of the target interval is the greatest, thereby controlling the playback speed of video frames within the target interval according to the ascending speed curve.

That is, it can be understood that in the embodiments, the closer the second control point is to the end position of the target interval, the larger the slope increase value of the corresponding ascending speed curve from the start position to the middle position. Thus, the movement of the second control point is associated with the slope increase, which can improve the interactive feeling of the operation.

Figure 12A:
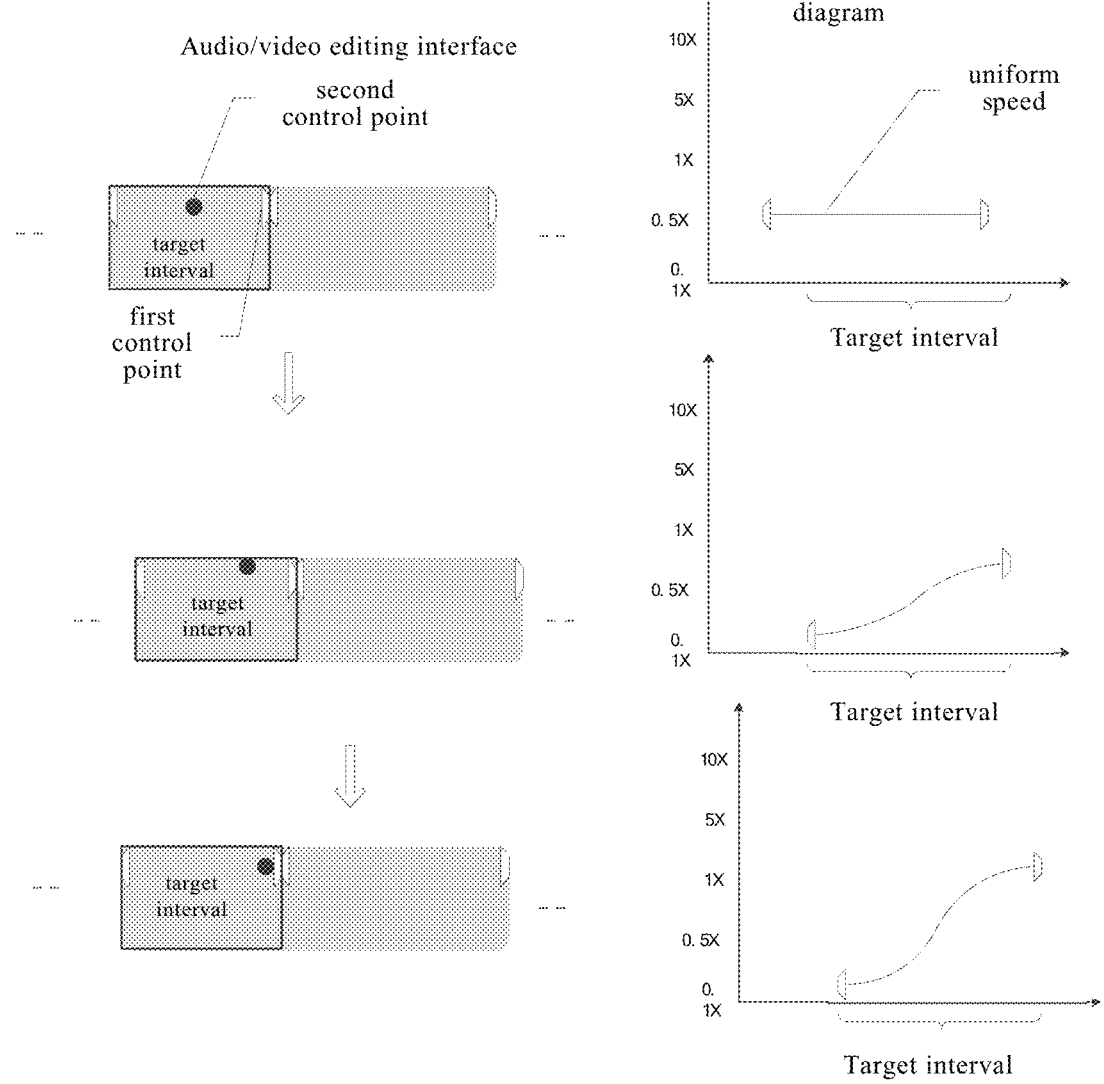
FIG. 12A is a schematic diagram of still another speed adjustment scenario for audio and video information provided in embodiments of the present disclosure.

When the second control point is moved between the middle position and the end position of the target interval, the ascending speed curve can be in any form base on an ascending trend and the slope gradually increases from the start position to the middle position of the target interval. For example, as shown in FIG. 12A, the slope gradually increases from the start position to the middle position of the target interval, and gradually decreases from the middle position to the end position of the target interval with the center position point as the center of symmetry. In the embodiments, referring to FIG. 12A, as the second control point approaches the end position of the target interval, the slope change rate from the start position to the middle position of the target interval gradually increases. If the second control point is located at the end position of the target interval, the slope change rate from the start position to the middle position of the target interval is the greatest. In this case, the speed curve has the largest slope value and the speed curve is overall steepest.

Figure 12B:
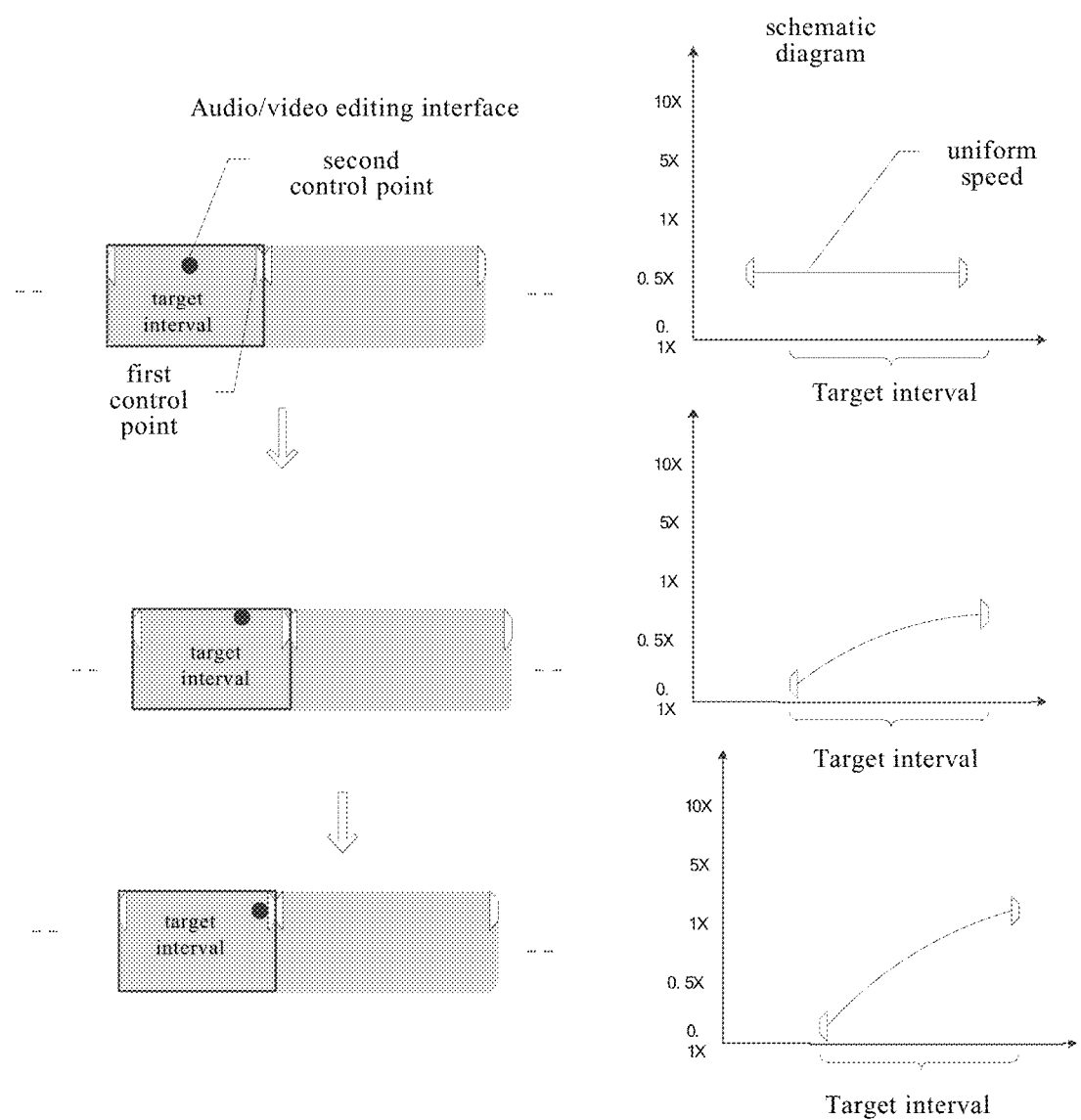
FIG. 12B is a schematic diagram of still another speed adjustment scenario for audio and video information provided in embodiments of the present disclosure.

For example, as shown in FIG. 12B, the speed curve can be a sine wave curve with positive slopes. From the start position to the end position of the target interval, the slope of the speed curve gradually decreases. Referring to FIG. 12B, as the second control point approaches the end position of the target interval, the slope change rate from the start position to the middle position of the target interval gradually increases. If the second control point is located at the end position of the target interval, the speed curve has the largest slope value.

In some embodiments of the present disclosure, in response to a movement of the second control point between the middle position and the end position of the target interval, the slope of the speed curve is adjusted to generate a descending speed curve. In response to the second control point located at the start position of the target interval, the speed curve has the smallest slope value, thereby controlling the playback speed of video frames within the target interval according to the descending speed curve. In the embodiments, due to the negative slope of the descending speed curve, the smaller the slope value corresponding to the speed curve, the steeper the speed curve. In this case, the smallest slope value can be understood as the smallest average value of the slope values at the points comprised in the speed curve.

That is, it can be understood that in the embodiments, the closer the second control point is to the start position of the target interval, the larger the slope decrease value of the corresponding descending speed curve from the start position to the middle position. Thus, the movement of the second control point is associated with the slope increase, which can improve the interactive feeling of the operation.

Figure 13A:
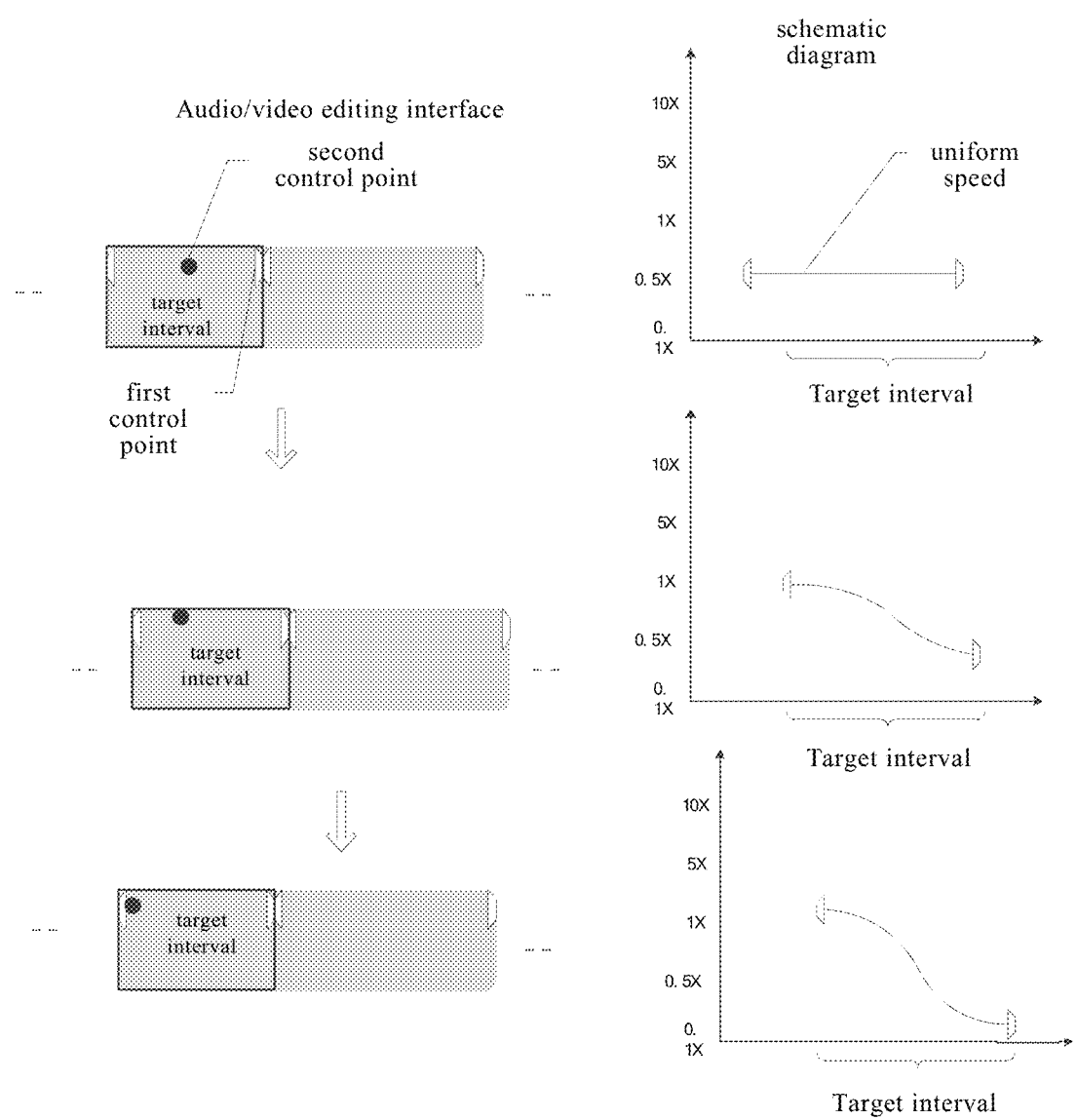
FIG. 13A is a schematic diagram of another speed adjustment scenario for audio and video information provided in embodiments of the present disclosure.

When the second control point is moved from the middle position to the end position of the target interval, the descending speed curve can be in any form in response to a descending trend and the absolute value of the slope gradually increases from the start position to the middle position of the target interval. For example, as shown in FIG. 13A, the absolute value of the slope gradually increases from the start position to the middle position of the target interval, and gradually decreases from the middle position to the end position of the target interval with the center position point as the center of symmetry. In the embodiments, referring to FIG. 13A, as the second control point approaches the start position of the target interval, the change rate of the absolute value of the slope gradually increases from the start position to the middle position of the target interval. If the second control point is located at the start position of the target interval, the speed curve has the smallest negative slope value and the speed curve is steepest.

Figure 13B:
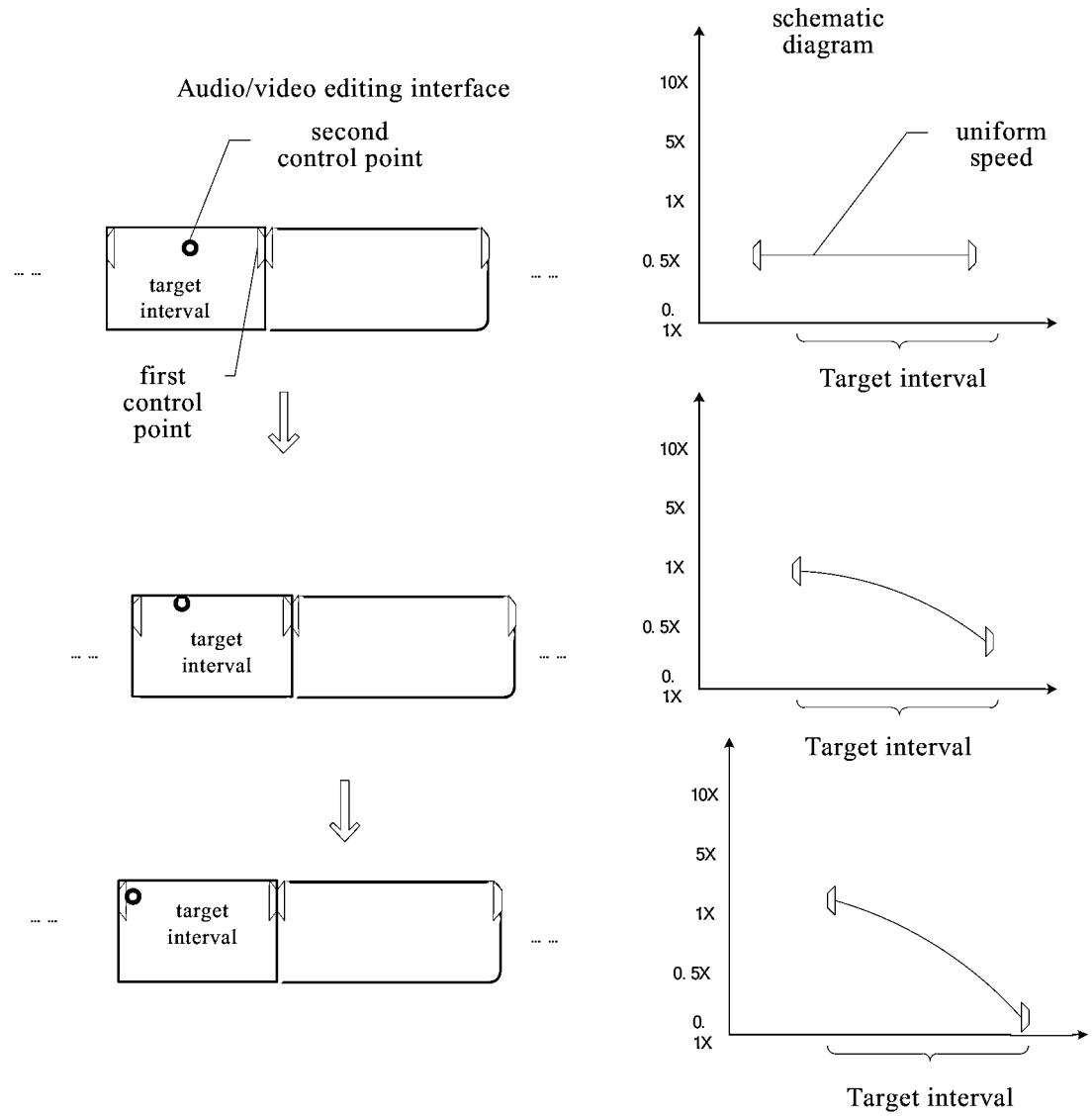
FIG. 13B is a schematic diagram of still another speed adjustment scenario for audio and video information provided in embodiments of the present disclosure.

For another example, as shown in FIG. 13B, the speed curve can be a sine wave curve with a negative slope. From the start position to the end position of the target interval, the absolute value of slope of the speed curve gradually increases. Referring to FIG. 13B, as the second control point approaches the start position of the target interval, the slope change rate from the start position to the middle position of the target interval gradually increases. If the second control point is located at the start position of the target interval, the speed curve has the smallest negative slope value, and the speed curve is steepest.

In order to avoid the poor playback effect of video frames caused by a speed adjustment that is too large as mentioned above, for example, which may cause a speed change that is too fast or too slow, in embodiments of the present disclosure, the speed curve has a limited speed range, and a speed adjustment range is limited based on the speed range.

In the embodiments, based on the speed adjusted by the first control point and a preset speed-up range corresponding to the speed curve with a slope adjusted, a speed range of the adjusted speed curve is determined, and the speed range is displayed in a preset area at the position of the second control point within the target interval. The speed range may be displayed in any form, such as a tag, floating display, etc., which indicates a speed adjustment range corresponding to the current second control point.

If the speed is constant, "n.nX speed" is displayed in the preset area at a position with respect to the target interval. If the speed is variable, "a.aX~b. bX speed" is displayed in the preset area at a position with respect to the target interval, wherein a.a is the playback speed at the start position, and b.b is the playback speed at the end position.

In some embodiments, the speed range of the adjusted speed curve can be determined based on the proximity between the speed adjusted by the first control point and the boundary values of the speed-up range corresponding to the slope of the speed curve. For example, the speed adjusted by the first control point can be used as the center value, and the closest boundary value can be used as a boundary value of the speed range.

Figure 14:
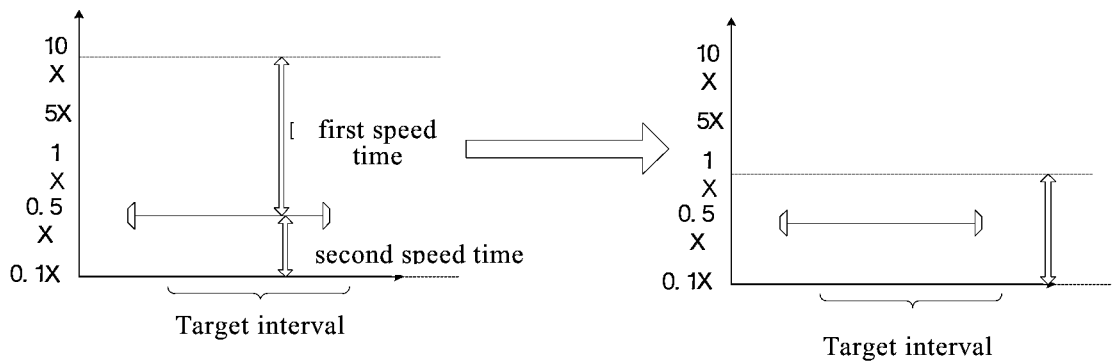
FIG. 14 is a schematic diagram of still another speed adjustment scenario for audio and video information provided in embodiments of the present disclosure.

For example, as shown in FIG. 14, if the speed adjusted by the first control point is 0.5× and the preset speed-up range is 0.1×-10×, a first speed time value is calculated based on 0.1× and 0.5×, and a second speed time value is calculated based on 10× and 0.5×. Based on the first and the second speed time values, a smaller speed time value is determined, i.e., the boundary value corresponding to the first speed time value is 0.1×. Therefore, with 0.1× as a boundary value and 0.5× as the center value, the speed range of the speed curve is determined to be 0.1×-1×.

In other embodiments, after obtaining the speed adjusted by the first control point, a sum of the speed and a preset adjustment value, and a difference between the first control point and the preset adjustment value are calculated. The sum and the difference are used as the maximum boundary value and the minimum boundary value of the speed range, respectively, to determine the speed range of the adjusted speed curve.

If the difference is less than the minimum value of the preset speed-up range corresponding to the speed curve with a slope adjusted, the minimum value of the speed-up range is used as the minimum boundary value of the speed range. Similarly, if the sum is greater than the maximum value of the preset speed-up range corresponding to the speed curve with a slope adjusted, the maximum value of the speed-up range is used as the maximum boundary value of the speed range.

When adjusting the slope based on a drag operation on the second control point within the target range, in order to improve the intuitiveness of the adjustment, a corresponding adjustment effect is also displayed in real-time based on the video frames.

In the embodiments, in response to a drag operation on the second control point within the target interval, the state of the speed adjustment performed on the video frames within the target interval is displayed. Based on the speed curve with a slope adjusted, video frames with decreased speeds within the target interval are widened for display, and video frames with increased speeds within the target interval are narrowed for display. The speed adjustment effect of the corresponding video frame is reflected by the width of the video frames. In an actual implementation process, after the adjustment is complete, the corresponding video frames can be displayed normally by frame extraction display, which is not specifically limited here.

Figure 15:
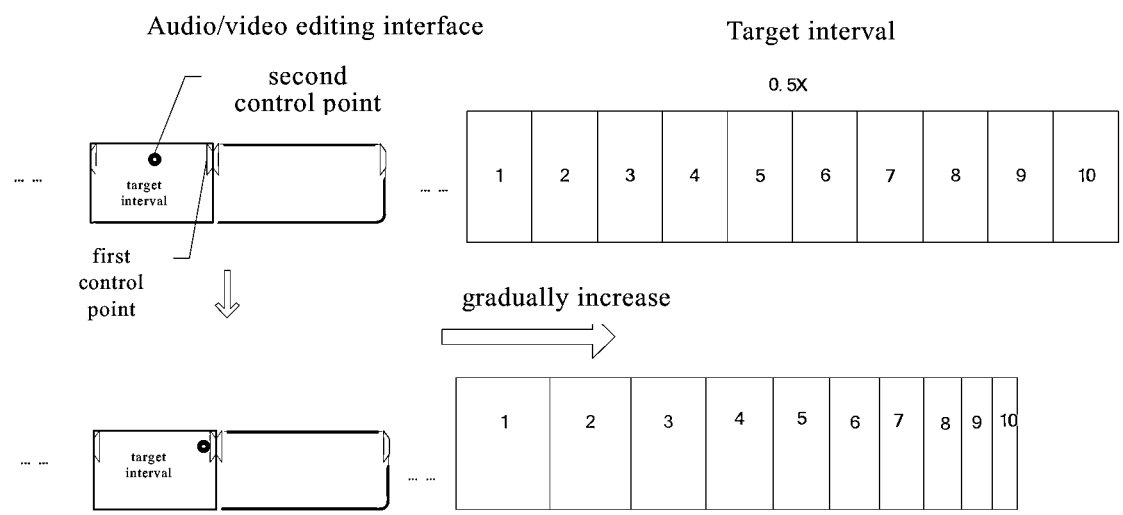
FIG. 15 is a schematic diagram of still another speed adjustment scenario for audio and video information provided in embodiments of the present disclosure.

For example, as shown in FIG. 15, if the second control point is in the middle position of the target interval, the playback speed is a constant speed set to 0.5×, and each video frame has the same width; if the user drags the second control point to the end position of the target interval, then video frames with decreased speeds within the target interval are widened for display, and video frames with increased speeds within the target interval are narrowed for display based on a speed curve with a slope adjusted.

In addition, in some embodiments, in order to improve the smoothness of video playback, speed alignment is performed if different intervals have similar speeds at their intersection.

In some embodiments of the present disclosure, in response to an activation operation on the second sticky control, which can be a visual control, etc, a speed curve with a slope adjusted is obtained based on the position of the second control point within the target interval, and a playback speed at the end position of the target interval is determined based on the speed curve with a slope adjusted. If the difference between the playback speed at the end of the target interval and the playback speed at the beginning of an adjacent interval is less than a preset threshold, which is calibrated based on experimental data, the speed at the end of the target interval is aligned with the speed at the beginning of the adjacent interval. This can ensure smooth video playback while meeting users' personal needs for speed adjustment.

Figure 16:
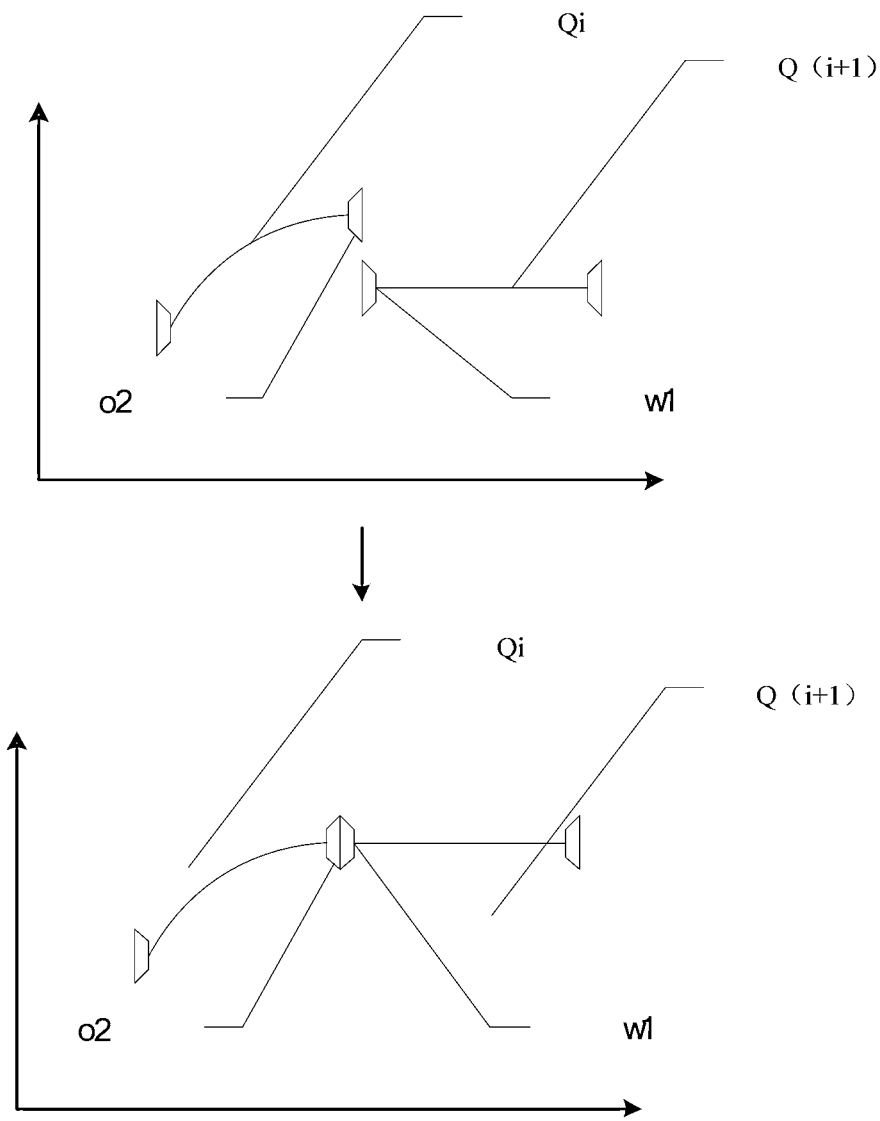
FIG. 16 is a schematic diagram of still another speed adjustment scenario for audio and video information provided in embodiments of the present disclosure.

For example, as shown in FIG. 16, if the difference between the playback speed at the end position o2 of the target interval Qi and the playback speed at the start position w1 of the adjacent interval Q(i+1) is less than a preset threshold, the playback speed at the end position of the target interval is aligned with the playback speed at the start position of the adjacent interval.

In summary, in the multimedia clip speed adjustment method provided by an embodiment of the present disclosure, according to different application scenarios, the slope of the speed curve can be flexibly determined based on a movement operation on the second control point, so as to meet the requirements for variable speed adjustment for the playback speed of video frames within the target interval, thereby improving the flexibility of the adjustment.

In order to implement the above embodiments, the present disclosure further provides a multimedia clip speed adjustment apparatus.

Figure 17:
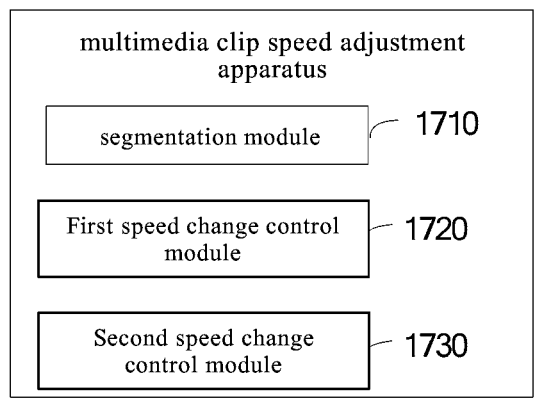
FIG. 17 is a schematic structure diagram of a multimedia clip speed adjustment apparatus provided in embodiments of the present disclosure.

FIG. 17 is a schematic structural diagram of a multimedia clip speed adjustment apparatus according to an embodiment of the present disclosure. The apparatus can be implemented by software and/or hardware, and can generally be integrated into an electronic device for speed adjustment of audio/video information. As shown in FIG. 17, the apparatus comprises: a segmentation module 1710, a first speed change control module 1720, and a second speed change control module 1730.

The segmentation module 1710 is used for segmenting a multimedia material clip into multiple intervals on an editing track for an audio or a video, the multiple intervals comprising a target interval, wherein a first control point and a second control point corresponding to the target interval are provided on the multimedia material clip.

The first speed change control module 1720 is used for adjusting, in response to a movement operation on the first control point, a speed change amount based on a position of the first control point on the editing track, controlling the speed of video frames within the target interval to vary according to the adjusted speed change amount, and increasing or decreasing a displayed length of the target interval on the editing track according to a playback duration of the speed-changed video frames.

The second speed change control module 1730 is used for adjusting, in response to a movement operation on the second control point, a slope of a speed curve based on a position of the second control point within the target interval, and controlling the speed of the video frames within the target interval to vary according to the speed curve with a slope adjusted.

The multimedia clip speed adjustment apparatus provided in this embodiment of the present disclosure can perform the multimedia clip speed adjustment method provided in any embodiment of the present disclosure, and has corresponding functional modules to implement the method and achieve the beneficial effect of the present disclosure.

In order to implement the above embodiment, the present application further provides a computer program product containing a computer program/instructions that, when executed by a processor, implement the multimedia clip speed adjustment method provided in the above embodiment.

Figure 18:
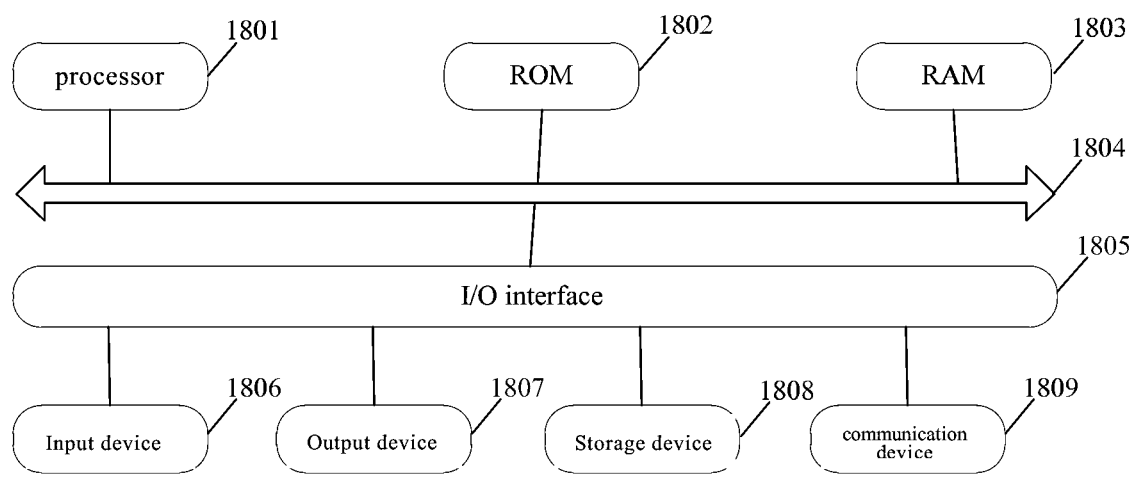
FIG. 18 is a schematic structural diagram of an electronic device provided in embodiments of the present disclosure.

FIG. 18 is a schematic structural diagram of an electronic device provided in embodiments of the present disclosure.

Referring to FIG. 18, a schematic structural diagram of an electronic device 1800 suitable for implementing the embodiments of the present disclosure is shown. The electronic device 1800 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 18 is merely an example and should not impose any limitation on the function and scope of the embodiment of the present disclosure.

As shown in FIG. 18, the electronic device 1800 may comprise a processing device (e.g., a central processing unit, a graphics processor) 1801, which may perform various appropriate actions and processes according to a program stored in Read Only Memory (ROM) 1802 or a program loaded from storage device 1808 into Random Access Memory (RAM) 1803. In RAM 1803, various programs and data required for the operation of the electronic device 1800 are also stored. The processing device 1801, ROM 1802, and RAM 1803 are connected to each other through a bus 1804. An input/output (I/O) interface 1805 is also connected to the bus 1804.

Generally, the following devices can be connected to the I/O interface 1805: input devices 1806 comprising, for example, a touch screen, a touch pad, a keyboard, a mouse, a camera, a microphone, an accelerometer, a gyroscope, etc; output devices 1807 comprising a liquid crystal display (LCD), a speaker, a vibrator, etc.; a storage device 1808 such as a magnetic tape, a hard disk, etc; and a communication device 1809. The communication device 1809 enables the electronic device 1800 to communicate in a wireless or wired manner with other devices to exchange data. Although FIG. 18 shows the electronic device 1800 with various components, it should be understood that it is not required to implement or have all of these components. Alternatively, more or fewer components can be implemented or provided.

For example, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 1809, or installed from the storage device 1808, or from the ROM 1802. When the computer program is executed by the processing device 1801, the above functions defined in the multimedia clip speed adjustment method according to the embodiment of the present disclosure are performed.

It should be noted that the computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer readable medium may be comprised in the electronic device described above; or it may exist alone without being assembled into the electronic device.

The computer-readable medium carries one or more programs that cause, when executed by the electronic device, the electronic device to perform steps of:

segmenting a multimedia material clip into multiple intervals on an editing track for an audio or a video, the multiple intervals comprising a target interval, wherein a first control point and a second control point corresponding to the target interval are provided on the multimedia material clip; adjusting, in response to a movement operation on the first control point, a speed change amount based on a position of the first control point on the editing track, controlling a speed of video frames within the target interval to change according to a speed change amount adjusted, and increasing or decreasing a displayed length of the target interval on the editing track according to a playback duration of the video frames of which the speed is changed; adjusting, in response to a movement operation on the second control point, a slope of a speed curve based on a position of the second control point within the target interval, and controlling the speed of the video frames within the target interval to change according to the speed curve with a slope adjusted. Therefore, through segmenting the multimedia material into multiple intervals, the playback speed of video frames within these intervals can be adjusted independently, and an overall speed adjustment can be made based on a first control point for video frames within each interval. It is also possible to achieve variable speed adjustment based on a second control point to allow different playback speeds of different video frames within the same interval. As a result, fine speed adjustment can be achieved for the video frames, and the accuracy and efficiency of speed adjustment can be improved. The computer program code for executing operations of the present disclosure may be complied by any combination of one or more program design languages, the program design languages comprising object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

An embodiment of the present disclosure further provides a computer product comprising instructions that, when executed by a processor, cause the processor to implement the multimedia clip speed adjustment method provided in the embodiment of the present disclosure.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the drawings. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A multimedia clip speed adjustment method, comprising:

segmenting a multimedia material clip into multiple intervals on an editing track for an audio or a video, the multiple intervals comprising a target interval, wherein a first control point and a second control point corresponding to the target interval are provided on the multimedia material clip;

adjusting, in response to a movement operation on the first control point, a speed change amount based on a position of the first control point on the editing track, controlling a speed of video frames within the target interval to change according to a speed change amount adjusted, and increasing or decreasing a displayed length of the target interval on the editing track according to a playback duration of the video frames of which the speed is changed; and adjusting, in response to a movement operation on the second control point, a slope of a speed curve based on a position of the second control point within the target interval, and controlling the speed of the video frames within the target interval to change according to the speed curve with a slope adjusted.

2. The multimedia clip speed adjustment method according to claim 1, wherein the first control point is placed at an end position of the target interval, the adjusting, in response to the movement operation on the first control point, the speed change amount based on the position of the first control point on the editing track comprises:

controlling the end position of the target interval moving to right on the editing track, in response to a right movement operation on the first control point, and decreasing the speed change amount based on the position of the first control point on the editing track, wherein a start position of the target interval on the editing track remains unchanged, or controlling the end position of the target interval moving to left on the editing track, in response to a left movement operation on the first control point, and increasing the speed change amount based on the position of the first control point on the editing track, wherein the start position of the target interval on the editing track remains unchanged.

3. The multimedia clip speed adjustment method according to claim 1, wherein the first control point is placed at a start position of the target interval, the adjusting, in response to the movement operation on the first control point, the speed change amount based on the position of the first control point on the editing track comprises:

controlling the start position of the target interval moving to right on the editing track, in response to a right movement operation on the first control point, and increasing the speed change amount based on the position of the first control point on the editing track, wherein an end position of the target interval on the editing track remains unchanged, or controlling the start position of the target interval moving to left on the editing track, in response to a left movement operation on the first control point, and decreasing the speed change amount based on the position of the first control point on the editing track, wherein the end position of the target interval on the editing track remains unchanged.

4. The multimedia clip speed adjustment method according to claim 1, wherein the controlling the speed of the video frames within the target interval to change according to the speed change amount adjusted comprises:

controlling the video frames within the target interval to be played back at a constant speed increased or a constant speed decreased according to the adjusted speed change amount, in response to the video frames within the target interval are played back at a constant speed; or controlling the video frames within the target interval to be played back at non-uniform speeds increased or non-uniform speeds decreased according to the adjusted speed change amount, in response to the video frames within the target interval are played back at non-uniform speeds based on the speed curve.

5. The multimedia clip speed adjustment method according to claim 1, further comprising:

detecting whether a number of the video frames within the target interval is less than a preset video threshold, in response to a segmentation operation on the target interval; and displaying prompt information indicating that the segmentation operation is not performed, in response to detecting the number of the video frames less than the video threshold.

6. The multimedia clip speed adjustment method according to claim 1, further comprising:

obtaining an end position of the movement operation on the first control point on the editing track, and aligning the end position with a segmentation position of another adjacent interval, in response to an activation operation on a first sticky control.

7. The multimedia clip speed adjustment method according to claim 1, wherein the adjusting, in response to the movement operation on the second control point, the slope of the speed curve based on the position of the second control point within the target interval, and controlling the speed of the video frames within the target interval to change according to the speed curve with a slope adjusted comprises:

setting the slope of the speed curve to zero to produce a constant speed line matching a speed set by the first control point, in response to the second control point placed in a middle position of the target interval; and controlling the video frames within the target interval to be played back at a constant speed according to the constant speed line.

8. The multimedia clip speed adjustment method according to claim 7, further comprising:

adjusting the slope of the speed curve to generate an ascending speed curve, in response to a movement of the second control point between the middle position and an end position of the target interval, wherein the speed curve has a largest slope value, in response to the second control point located at the end position of the target interval; and controlling the video frames within the target interval to be played back at playback speeds according to the ascending speed curve.

9. The multimedia clip speed adjustment method according to claim 7, further comprising:

adjusting the slope of the speed curve to generate a descending speed curve, in response to a movement of the second control point between the middle position and a start position of the target interval, wherein the speed curve has a smallest slope value, in response to the second control point located at the start position of the target interval; and controlling the video frames within the target interval to be played back at playback speeds according to the descending speed curve.

10. The multimedia clip speed adjustment method according to claim 1, further comprising:

determining a speed range of the speed curve adjusted, based on a speed adjusted by the first control point and a preset speed-up range corresponding to the speed curve with a slope adjusted; and displaying the speed range in a preset area at a position of the second control point within the target interval.

11. The multimedia clip speed adjustment method according to claim 1, further comprising:

displaying a speed adjustment state of the video frames with a speed adjustment within the target interval, in response to a drag operation on the second control point within the target interval; and widening video frames with decreased speeds within the target interval for display, narrowing video frames with increased speeds within the target interval for display, based on the speed curve with a slope adjusted.

12. The multimedia clip speed adjustment method according to claim 1, further comprising:

obtaining the speed curve with the slope adjusted based on the position of the second control point within the target interval, in response to an activation operation on a second sticky control;

determining a playback speed at an end position of the target interval based on the speed curve with the slope adjusted; and aligning the playback speed at the end position of the target interval with a playback speed at a start position of an adjacent interval, in response to a difference between the playback speed at the end position of the target interval and the playback speed at the start position of the adjacent interval is less than a preset threshold.

13. The multimedia clip speed adjustment method according to claim 1, further comprising:

displaying a schematic diagram corresponding to the multimedia material clip in an area of a function panel associatively, wherein the schematic diagram comprises a schematic interval corresponding to the target interval, and a speed control indicator corresponding to the first control point; and displaying a speed adjusted based on the first control point for the target interval in the schematic interval.

14. The multimedia clip speed adjustment method according to claim 13, further comprising:

adjusting the slope of the speed curve based on the position of the second control point within the target interval; and displaying the speed curve with the slope adjusted in the schematic interval in association with a speed range of the speed curve.

15. The multimedia clip speed adjustment method according to claim 13, further comprising:

comparing speeds corresponding to speed control indicators of adjacent schematic intervals, in response to a draft saving operation;

combining and saving a speed control indicator at an end position of a left adjacent schematic interval and a speed control indicator at a start position of a right adjacent interval as one speed control point for display on a mobile device, in response to the speed control indicator at the end position of the left adjacent schematic interval and the speed control indicator at the start position of the right adjacent interval correspond to a same speed; and saving the speed control indicator at the end position of the left adjacent schematic interval and the speed control indicator at the start position of the right adjacent interval separately as two speed control points for display on the mobile device, in response to the speed control indicator at the end position of the left adjacent schematic interval and the speed control indicator at the start position of the right adjacent interval correspond to different speeds.

16. An electronic device, comprising:

a processor;

a memory for storing processor executable instructions;

wherein the processor is used to read the executable instructions from the memory and execute the instructions to implement a multimedia clip speed adjustment method comprising:

segmenting a multimedia material clip into multiple intervals on an editing track for an audio or a video, the multiple intervals comprising a target interval, wherein a first control point and a second control point corresponding to the target interval are provided on the multimedia material clip;

adjusting, in response to a movement operation on the first control point, a speed change amount based on a position of the first control point on the editing track, controlling a speed of video frames within the target interval to change according to a speed change amount adjusted, and increasing or decreasing a displayed length of the target interval on the editing track according to a playback duration of the video frames of which the speed is changed; and adjusting, in response to a movement operation on the second control point, a slope of a speed curve based on a position of the second control point within the target interval, and controlling the speed of the video frames within the target interval to change according to the speed curve with a slope adjusted.

17. A non-transitory computer readable storage medium storing thereon a computer program that, when executed by a processor, causes the processor to implement a multimedia clip speed adjustment method comprising:

segmenting a multimedia material clip into multiple intervals on an editing track for an audio or a video, the multiple intervals comprising a target interval, wherein a first control point and a second control point corresponding to the target interval are provided on the multimedia material clip;

adjusting, in response to a movement operation on the first control point, a speed change amount based on a position of the first control point on the editing track, controlling a speed of video frames within the target interval to change according to a speed change amount adjusted, and increasing or decreasing a displayed length of the target interval on the editing track according to a playback duration of the video frames of which the speed is changed; and adjusting, in response to a movement operation on the second control point, a slope of a speed curve based on a position of the second control point within the target interval, and controlling the speed of the video frames within the target interval to change according to the speed curve with a slope adjusted.

* * * * *